(12) United States Patent
Yoshitake

(10) Patent No.: US 11,544,295 B2
(45) Date of Patent: Jan. 3, 2023

(54) SEARCH SYSTEM AND SEARCH METHOD FOR FINDING NEW RELATIONSHIPS BETWEEN MATERIAL PROPERTY PARAMETERS

(71) Applicant: NATIONAL INSTITUTE FOR MATERIALS SCIENCE, Tsukuba (JP)

(72) Inventor: Michiko Yoshitake, Tsukuba (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 0 days.

(21) Appl. No.: 17/266,591

(22) PCT Filed: Aug. 1, 2019

(86) PCT No.: PCT/JP2019/030108
§ 371 (c)(1),
(2) Date: Feb. 6, 2021

(87) PCT Pub. No.: WO2020/039871
PCT Pub. Date: Feb. 27, 2020

(65) Prior Publication Data
US 2021/0303601 A1    Sep. 30, 2021

(30) Foreign Application Priority Data
Aug. 23, 2018   (JP) .............................. JP2018-155925

(51) Int. Cl.
*G06F 16/28* (2019.01)
*G06F 16/242* (2019.01)
(Continued)

(52) U.S. Cl.
CPC .......... *G06F 16/288* (2019.01); *G06F 16/248* (2019.01); *G06F 16/2428* (2019.01);
(Continued)

(58) Field of Classification Search
None
See application file for complete search history.

(56) References Cited

U.S. PATENT DOCUMENTS

| 10,726,202 B2 * | 7/2020 | Levitt .................. G06F 40/279 |
| 2005/0038608 A1 * | 2/2005 | Chandra ................ G16B 20/20 |
| | | 700/86 |

(Continued)

FOREIGN PATENT DOCUMENTS

| JP | H10-207906 A | 8/1998 |
| JP | 2007-018444 A | 1/2007 |
| WO | WO 2017/221444 A1 | 12/2017 |

OTHER PUBLICATIONS

Ashin et al., "Formalization of material property data analysis with web ontology", 2017 (Year: 2017).*
Michiko Yoshitake et al., "Materials Curations™: Formation Enthalpy vs. Materials Properties", Proceedings of the 65th Spring Meeting of the Japan Society of Applied Physics, 18a-F202-1, 2018.

(Continued)

*Primary Examiner* — Dawaune A Conyers
(74) *Attorney, Agent, or Firm* — SGPatents PLLC

(57) ABSTRACT

To effectively utilize knowledge of relationship information among material property parameters the users tangibly and intangibly have in a search system that generates a graph in which material property parameters are nodes and relationships of the material property parameters are edges from a database of material property parameter pairs whose relationships are already known, and conducts a path search in the generated graph. A search system, which includes the database, a graph generator that generates the graph, and a graph searcher searches the graph, further includes a user interface and a user information storage unit corresponding to each user. The user conducts a search unique to the user by inputting relationship information between the material property parameters that he has to the user information storage unit and integrating the relationship information into the above graph. Further, by accumulating a history of (Continued)

searches conducted by the user in the user information storage unit and analyzing the search history, the user can be provided with new knowledge.

11 Claims, 24 Drawing Sheets

(51) Int. Cl.
*G06F 16/2452* (2019.01)
*G06F 16/248* (2019.01)
*G06F 40/247* (2020.01)

(52) U.S. Cl.
CPC ...... *G06F 16/24526* (2019.01); *G06F 16/287* (2019.01); *G06F 40/247* (2020.01)

(56) References Cited

U.S. PATENT DOCUMENTS

2013/0212057 A1* 8/2013 Lee .................. G06F 16/367
706/47
2017/0092154 A1* 3/2017 Dhoolia .................. G09B 5/00
2018/0082183 A1 3/2018 Hertz et al.
2018/0285399 A1* 10/2018 Altizer ............... G06F 16/2272

OTHER PUBLICATIONS

Michiko Yoshitake, "Utilization of Information on Materials in Multi-Dimensional", Journal of Surface Analysis vol. 25 No. 1 (2018) pp. 2-8.

Michiko Yoshitake et al., "System for Searching Relationship among Physical Properties for Materials Curation™", Surface and Vacuum vol. 61, No. 4, pp. 200-205, 2018.

International Search Report from International Patent Application No. PCT/JP2019/030108, dated Sep. 3, 2019.

Extended European Search Report dated Aug. 17, 2021, in European Patent Application No. 19852830.9.

* cited by examiner

FIG. 8

|   | query ("search path(s) ...") | search operation |
|---|---|---|
| 1 | from A to B | paths of start point A → end point B |
| 2 | from A to B including D in the paths | paths of start point A → end point B via D |
| 3 | from A to B excluding D in the paths | paths of start point A → end point B not via D |
| 4 | from A to B within n paths | paths of start point A → end point B having length ≦ n |
| 5 | around M within m paths | paths of around node M having length ≦ m |
| 6 | from M/to M within m paths | paths of start point M or end point M having length ≦ m |
| 7 | around M within m1-m2 paths | paths of around node M having m1 ≦ length ≦ m2 |
| 8 | from M/to M within m1-m2 paths | paths of start point M or end point M having m1 ≦ length ≦ m2 |

FIG. 9

|   | display option | display operation |
|---|---|---|
| 1 | all paths | display all paths |
| 2 | shortest path | display shortest path |
| 3 | within p paths | display paths having length ≦ p |
| 4 | difference within n-paths/[other opt.] | display difference between search result of query 4 and other search results |
| 5 | difference within m1-paths | display difference between search result of query 7,8 and paths having length less than m1 |
| 6 | common paths with from A to X | display common path between search result and path of start point A and end point X |
| 7 | uncommon paths with from A to X | display uncommon path between search result and path of start point A and end point X |
| 8 | common paths with from Y to B | display common path between search result and path of start point Y and end point B |
| 9 | uncommon paths with from Y to B | display uncommon path between search result and path of start point Y end point B |
| 10 | around the end node within c1 paths | display path of c1 or less around end point B |
| 11 | similar paths | display another search that shares many paths with search results |
| 12 | similar graph | display another search with graph similar to search result |

FIG. 12

11, INPUT FORM

| CAUSE SIDE | RESULT SIDE | PRESENCE OR ABSENCE OF RELATION-SHIP | RELATIONS-HIP MEMO | RELATION-SHIP CLASSIFI-CATION 1 | RELATION-SHIP CLASSIFI-CATION 2 | CONDITION NODE | CONDITION | RELATION-SHIP |
|---|---|---|---|---|---|---|---|---|
| A | D | | | | | | | |
| B | D | | | | | | | |
| B | A | | | | | | | |
| D | E | | | | | | | |
| E | D | | | | | | | |
| C | E | | | | | | | |
| E | C | | | | | | | |
| M | M | | | | | | | |
| C | J | | | | | | | |
| K | K | | | | | | | |
| J | L | | | | | | | |
| J | J | | | | | | | |
| L | K | | | | | | | |
| L | K | | | | | | | |
| I | C | | | | | | | |
| K | F | | | | | | | |
| G | F | | | | | | | |
| G | I | | | | | | | |
| I | H | | | | | | | |
| G | | | | | | | | |
| L | | | | | | | | |

FIG. 13

| MATERIAL PROPERTY (NODE) | EDGES | | | MEASUR-ABILITY | DATA VOLUME OF DATABASE | MATERIAL PROPERTY VALUE |
|---|---|---|---|---|---|---|
| | OUTGOING EDGES | ENTERING EDGES | NUMBER OF EDGES | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |

[A-D-E-G-H]
[A-D-E-G-I-K-J-L-H]
[A-D-E-C-M-J-L-H]

[A-D-E-C-M-J-L-H]

[A-D-E-O-P-G-H]

[A-D-E-O-P-G-C-M-J-L-H]

[A-D-E-O-N-P-G-H]

[A-D-E-O-N-P-G-C-M-J-L-H]

FIG. 22
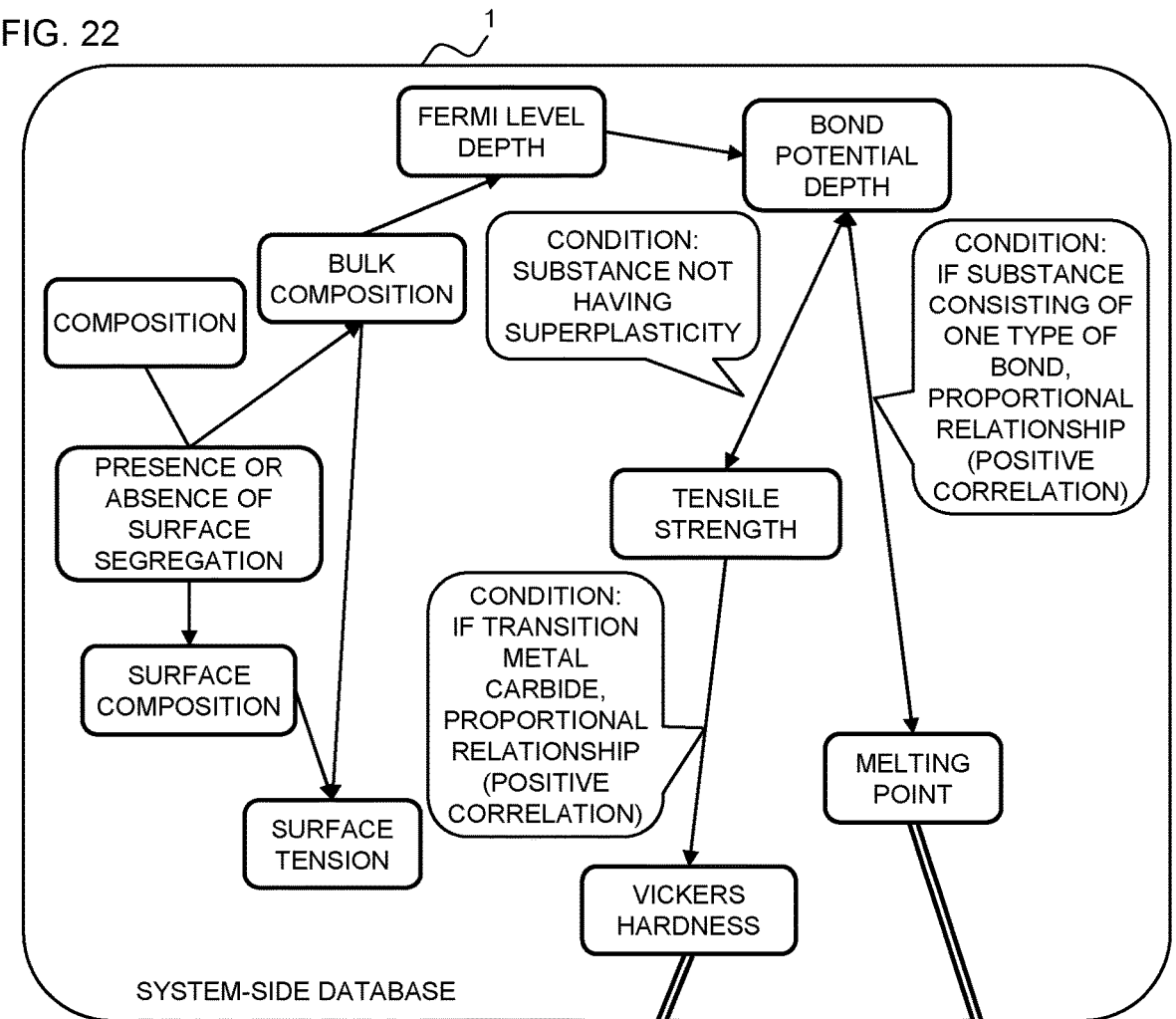
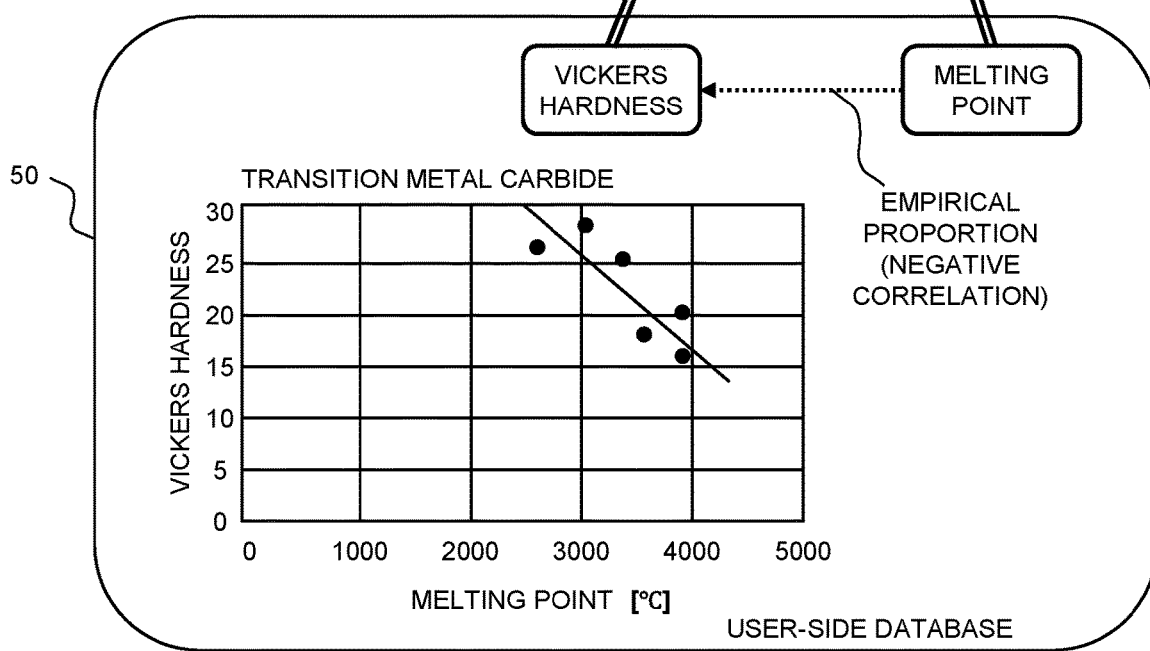

SEARCH SYSTEM AND SEARCH METHOD FOR FINDING NEW RELATIONSHIPS BETWEEN MATERIAL PROPERTY PARAMETERS

TECHNICAL FIELD

The present invention relates to a search system and a search method using a database, and more particularly, to a search system and a search method that can suitably be used for searching for relationships among a plurality of material property parameters.

BACKGROUND ART

An objective of prediction and design in material research is to identify materials having target characteristics. A method that has been widely used to achieve this objective is to identify a material having target characteristics from a condition-characteristic chart. The method is: observing a change in a characteristic upon changing one specific condition among a plurality of conditions to create a chart, and interpolating or extrapolating the chart to obtain a condition under which the target characteristic is achieved, thereby identifying a material that matches the target characteristics. The term "chart" herein is synonymous with "graph," like a line graph. However, the term "chart" is hereafter used to distinguish from a "graph" consisting of nodes and edges, which will be described later.

Here, a change in characteristics upon changing one specific condition among a plurality of conditions is often obtained experimentally. This is because, even if many literatures are searched, it is difficult to obtain a large amount of data having the same conditions except for the above specified condition.

PTL 1 discloses a search system capable of objectively searching for constituent substance information of a new material having desired characteristics.

The search system disclosed in PTL 1 includes a database containing a plurality of pieces of material property parameter information for each of a plurality of (many) substances. Here, for some substances, material property parameters to which real data has not been provided may be contained in the database. Two-dimensional space or three or more-dimensional space is created with a material property parameter to be searched for being one axis and some of the other material property parameters being the other axis (or axes), and each of the substances in the database is mapped in the space. At this time, material property parameters without real data are interpolated by virtual data predicted by multivariate analysis, calculation based on a predetermined logical expression, the first principle calculation, etc. In a search map obtained by mapping real data and virtual data, a substance having desired characteristics is to be specified based on a predefined rule.

PTL 2 discloses a search system and a search method capable of searching for an unknown combination of material property parameters having a significant relationship based on an already known relationship from among a plurality of arbitrary combinations of material property parameters. This search system includes a database, a graph generator and a graph searcher, and is configured as follows. The database stores a plurality of pairs of material property parameters having mutual relationships, and the graph generator generates a graph in which a plurality of material property parameters stored in the database are nodes and in between the nodes corresponding to the material property parameter pairs stored to have mutual relationship are edges. The graph searcher searches the graph generated by the graph generator under a provided search condition and outputs a search result.

PRIOR ART DOCUMENT

Patent Document

PTL 1: Japanese Patent Application Laid-Open NO. 2007-18444

PTL 2: International Publication NO. WO 2017/221444

SUMMARY OF THE INVENTION

Problems to be Solved by the Invention

The inventor has studied PTL 1 and PTL 2, and found new problems as follows.

In the technique described in PTL 1, relationships among a plurality of material property parameters used to predict virtual data are limited to those already known.

The inventor of the present application has found the following: when search is executed across a plurality of technical fields as described above, the number of material property parameters becomes very large and, therefore, it is possible to extract an unknown combination of material property parameters having a significant relationship based on already known relationships from among a plurality of arbitrary combinations of material property parameters. The inventor of the present application proposed the search system described in PTL 2 as a solution to PTL 1.

According to the search system and the search method described in PTL 2, a user can conduct a search across all fields including those having less close relationships. Therefore, an unknown combination of material property parameters having a significant relationship can be extracted.

The inventor have newly found that the related art search systems have the following problem. A user can only passively use the search system by providing a search condition such as a query to obtain a search result. With such a less interactive searching activity of the user, the user's own knowledge cannot be utilized in the search.

The problem is, for example, even if the users has their own database, they cannot use that database effectively in the search system. In the search system disclosed in PTL 2, for example, it is a precondition that relationships of material property parameters known in as many fields as possible are included. In other words, the search range to be provided to users is within the database the system contains.

Further, users often repeat searches under a certain hypothesis in order to achieve the purpose of the search, but the user's own knowledge behind that hypothesis cannot be utilized for making the search more efficient (for example, reducing the number of times of searches) to achieve the purpose. However, in this case, the user's knowledge has not often been clear.

An objective of the invention is to provide a search system and a search method capable of effectively utilize knowledge of relationship information among material property parameters that the users tangibly and intangibly have.

Means for solving such a problem will be described below. Other problems and novel features will become obvious from the description of the specification and the accompanying drawings.

Means for Solving the Problem

According to one embodiment, the following is provided.

That is, a search system includes a database, a graph generator and a graph searcher, and is configured as follows.

The database stores a plurality of pairs of material property parameters having mutual relationships, and the graph generator generates a graph in which a plurality of material property parameters stored in the database are nodes and in between the nodes corresponding to the material property parameter pairs stored to have mutual relationship are edges. The graph searcher searches the graph generated by the graph generator under a provided search condition and outputs a search result.

The search system further includes a user interface and a user information storage unit corresponding to each user. User information input directly through the user interface or including a search history of an input search condition is stored in the user information storage unit. The stored information is collated or integrated with a database or a graph to be searched to provide feedback of user-specific reference information or execute a user-specific search. The "user" here is not limited to a single person, and may be a user group consisting of a plurality of people.

Effect of the Invention

The effect to be obtained by the above embodiment will be briefly described below.

That is, in a search system that generates a graph in which material property parameters are nodes and the relationship thereof is an edge from a database of material property parameter pairs of which mutual relationship is already known, a search system and a search method in which knowledge of relationship information among material property parameters that users tangibly and intangibly have can be effectively utilized.

BRIEF DESCRIPTION OF THE DRAWINGS

FIG. 8 is an explanatory diagram illustrating queries.

FIG. 9 is an explanatory diagram illustrating display options.

FIG. 12 is an explanatory diagram illustrating a modified example of an input form.

FIG. 13 is an explanatory diagram illustrating a further example of the input form for describing attributes of nodes.

FIG. 22 is an explanatory diagram illustrating an aspect in which a user-side database is being collated with a system-side database.

DETAILED DESCRIPTION OF THE INVENTION

1. Outline of Embodiments

Figure 1:
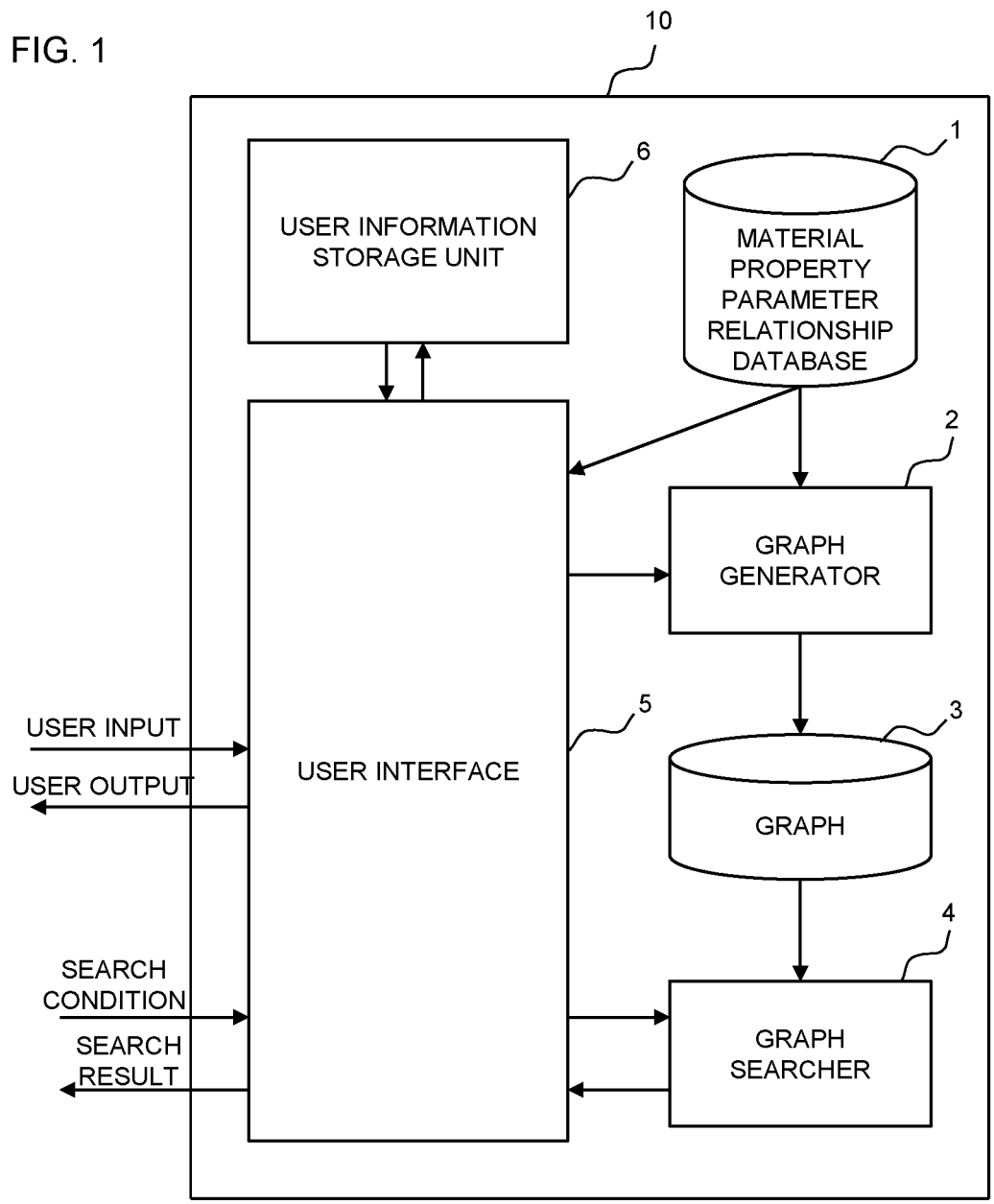
FIG. 1 is a block diagram illustrating a configuration example of a search system according to a first embodiment.

First, an outline of a typical embodiment disclosed herein will be described. Reference signs in the drawings also referenced in parentheses in the description of the outline of the typical embodiment merely exemplify those included in the concept of the components to which the reference signs are given.

[1] Search System with User Interface and User Information Storage Unit

A typical embodiment of the invention is a search system (10) including a database (1), a graph generator (2) and a graph searcher (4), and is configured as follows (FIG. 1).

The search system (10) further includes a user interface (5) and a user information storage unit (6).

The database stores a plurality of parameter pairs of material property parameters having mutual relationships, and the graph generator generates a graph (3) in which a plurality of material property parameters included in the parameter pair are nodes and in between the nodes corresponding to the parameter pair is an edge. The graph searcher searches the graph based on a provided search condition (including a query) via the user interface, and outputs a search result.

The user interface makes user input data be held by the user information storage unit for each user identified based on user identification information. Here, the user is not limited to a single person, and may be a user group consisting of a plurality of people.

In this manner, knowledge of relationship information among material property parameters the users tangibly and intangibly have can be utilized effectively.

[2] Integration with User-Side Database

Figure 14:
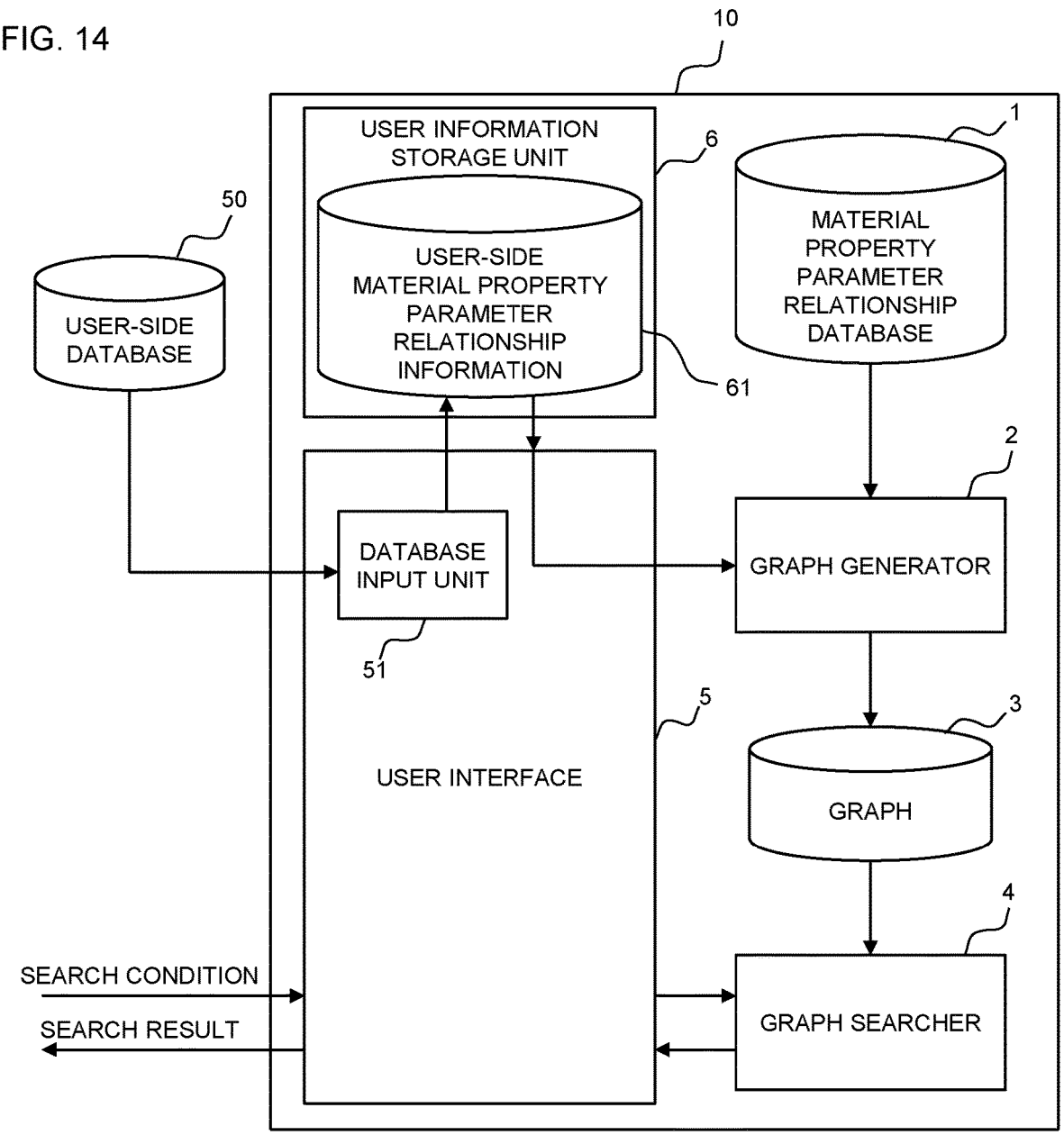
FIG. 14 is a block diagram illustrating a configuration example of a search system according to a second embodiment.

In the search system of [1], the database is referred to as a first database (1), the parameter pair is referred to as a first parameter pair, and the user interface further includes a database input unit (51) in which a second database (50) can be input (FIG. 14).

The database input unit is configured to be capable of extracting, as a second parameter pair, a pair of material property parameters having a mutual relationship from the second database, and making the second parameter pair and its relationship information be held by the user information storage unit (6).

The graph generated by the graph generator is a graph in which a plurality of material property parameters included in either of the first or the second parameter pair are nodes, and in between the nodes corresponding to the second parameter pair in addition to the first parameter pair are edges.

In this manner, the relationship information among the material property parameters that users uniquely have can be utilized effectively.

[3] Integration with User-Side Database; Parameter Name Matching

Figure 20:
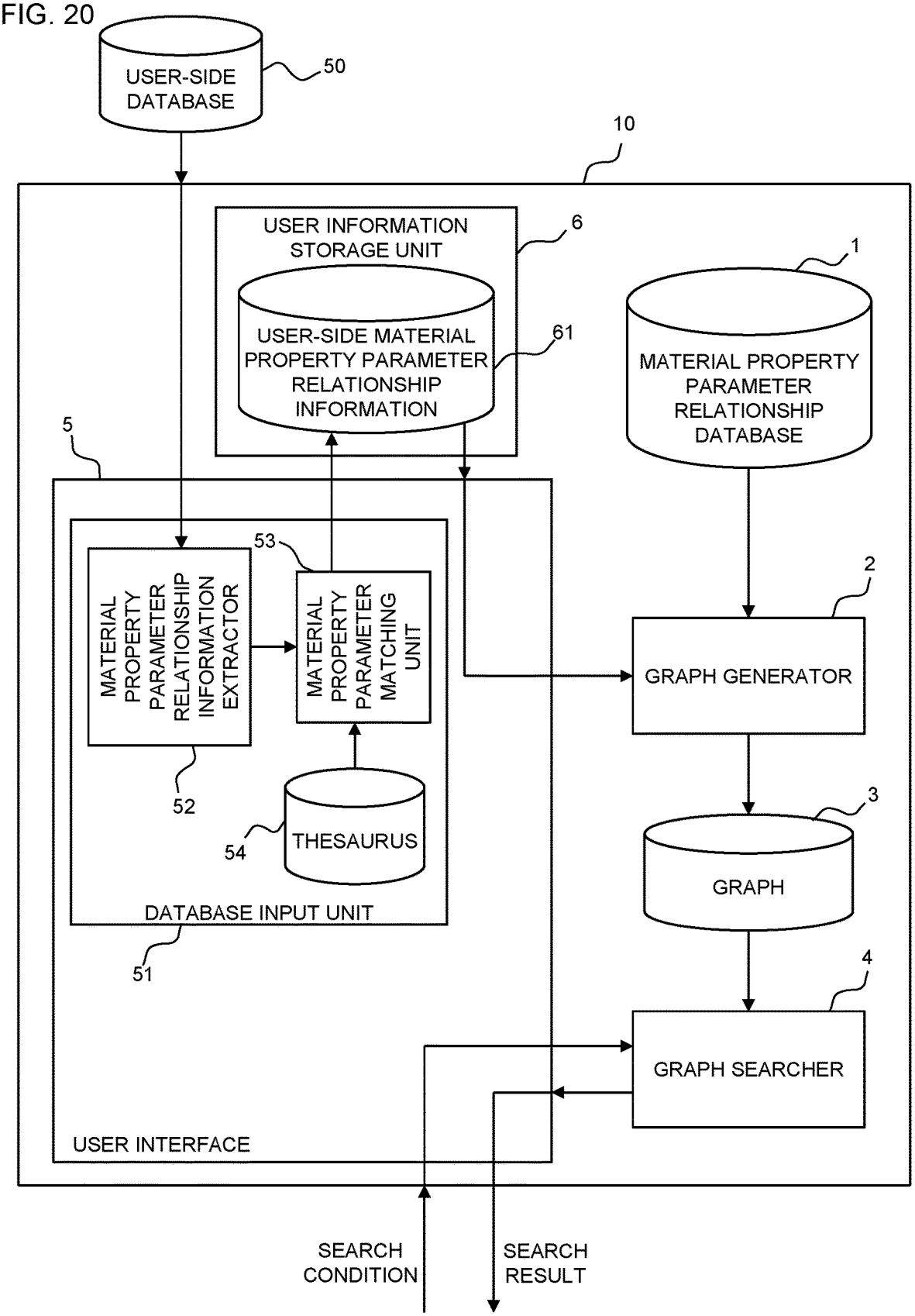
FIG. 20 is a block diagram illustrating a configuration example of a search system according to a third embodiment.

In the search system of [2], the database input unit further includes a material property parameter relationship information extractor (52), a material property parameter matching unit (53) and a thesaurus (54) (FIG. 20).

The material property parameter relationship information extractor extracts a plurality of second material property parameter names from the second database. The material property parameter matching unit refers to the thesaurus, collates the plurality of second material property parameter names with the plurality of first material property parameter names stored in the first database, and if they differ from each other, changes the second material property parameter names to the first material property parameter names for the matching of the names of the material property parameters.

In this manner, appearance inconsistency such as a difference in expression between the relationship information that users uniquely have among the material property parameters and the relationship information that the search system side has as user-independent common information can be removed, and information users have can be used more effectively.

[4] Integration with User-Side Database; Collation of Relationship Information

Figure 21:
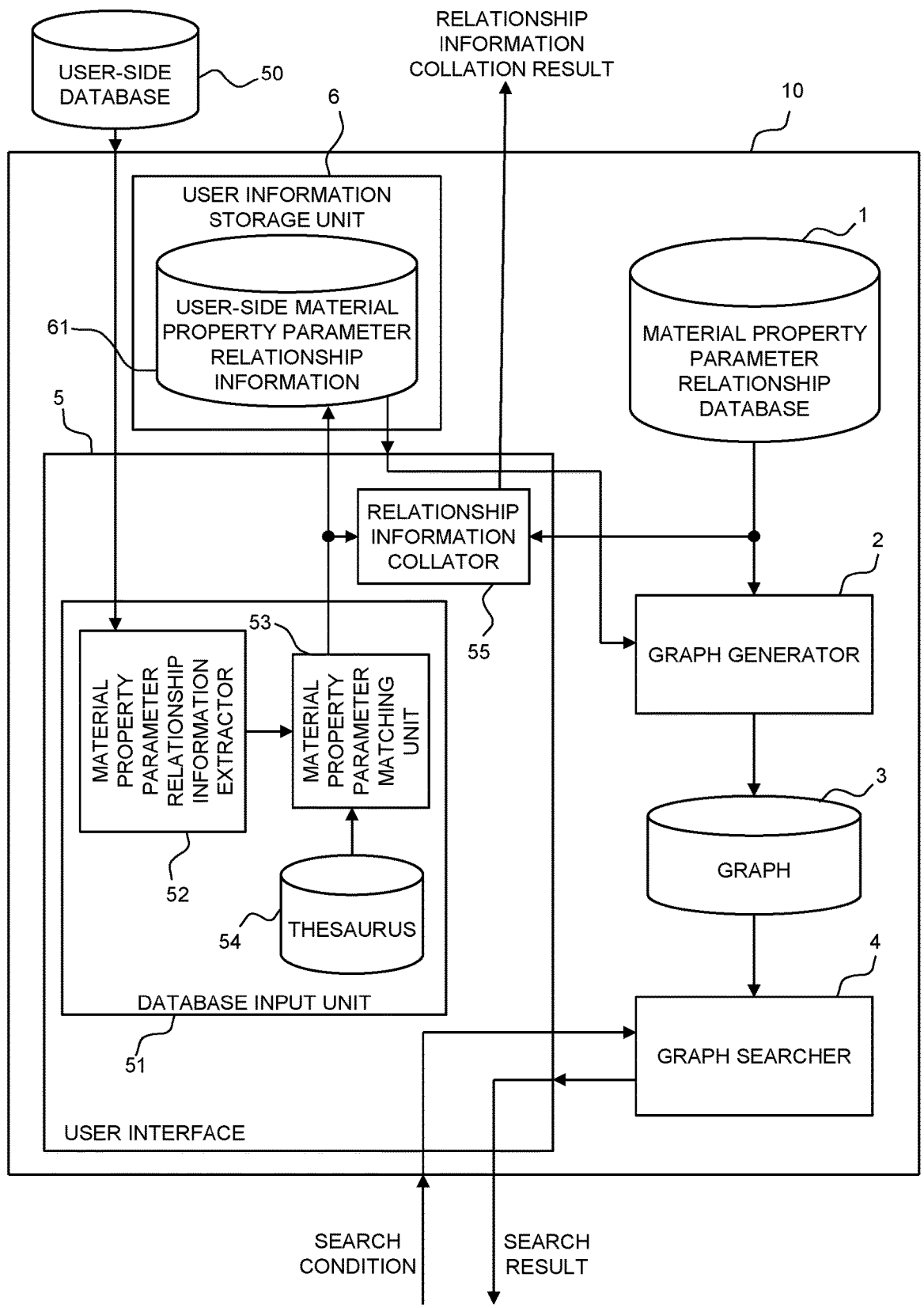
FIG. 21 is a block diagram illustrating a configuration example of a search system according to a fourth embodiment.

In the search system of [3], the user interface further includes a relationship information collator (55) (FIG. 21).

The relationship information collator collates the relationship information about a pair of the same material property parameters between the first parameter pair and the second parameter pair, and outputs a collation result.

In this manner, the user can verify correctness, completeness, etc. of the relationship information among the material property parameters he/she uniquely has.

[5] Maintenance and Management of Search History

Figure 26:
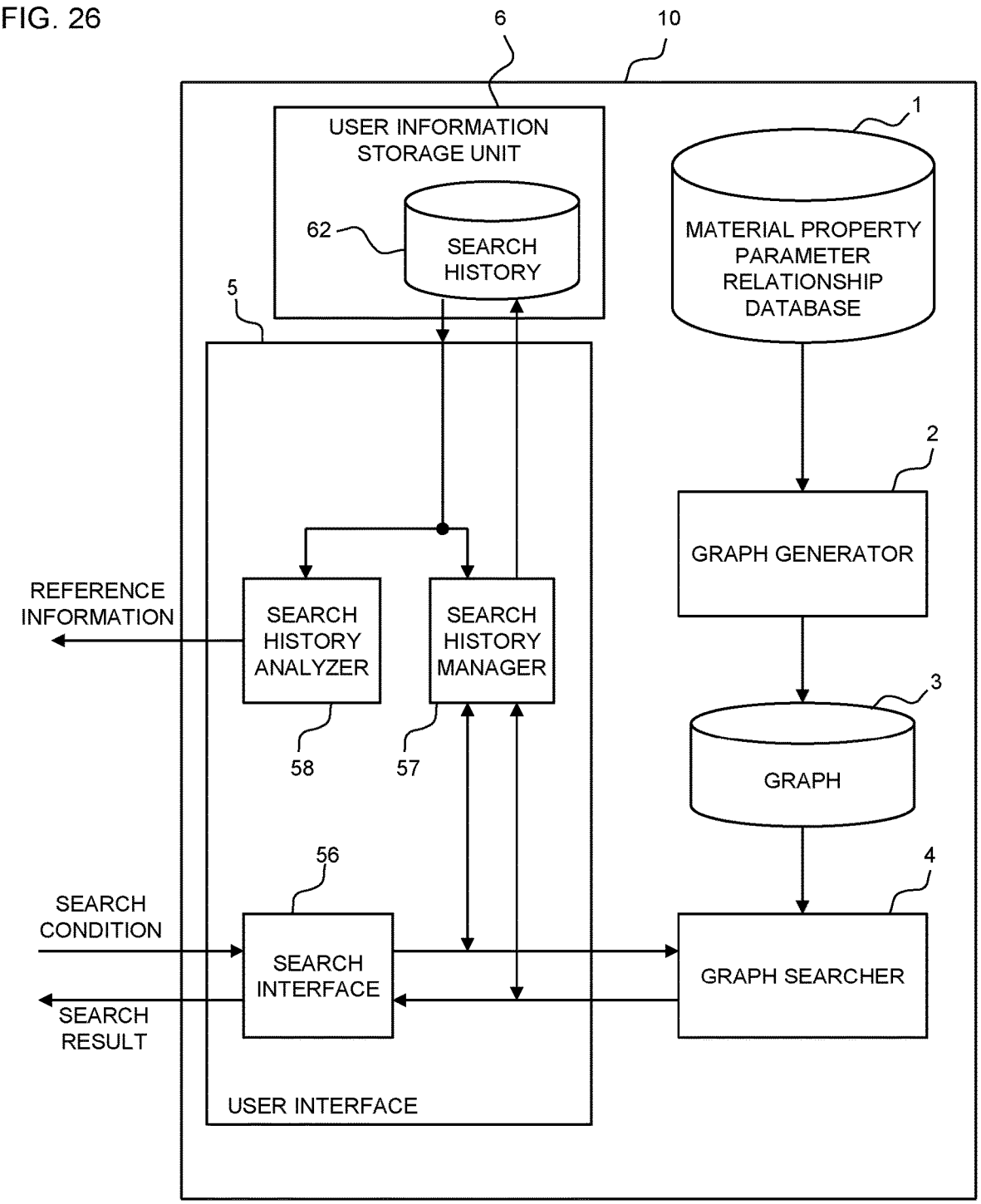
FIG. 26 is a block diagram illustrating a configuration example of a search system according to fifth and sixth embodiments.

In the search system of [1], the user interface further includes a search interface (56) and a search history manager (57) (FIG. 26).

The search interface inputs a search condition specified by the user to the graph searcher, and outputs a search result output from the graph searcher to the user. The search history manager holds at least a search condition among a search condition and a search result corresponding thereto in the search history holder as a search history.

The user interface is configured so that the user can refer to the search history held in the search history holder.

In this manner, the user can manage his/her own search history.

[6] Analysis of Search History

In the search system of [5], it is more preferable that the user interface further includes a search history analyzer (58) (FIG. 26).

The search history analyzer analyzes the search history held in the search history holder and presents an analysis result to the user.

In this manner, the user can obtain knowledge from his/her own search history and use the knowledge in his/her future searches.

[7] Material Property Parameter Relationship Data Extractor

Figure 28:
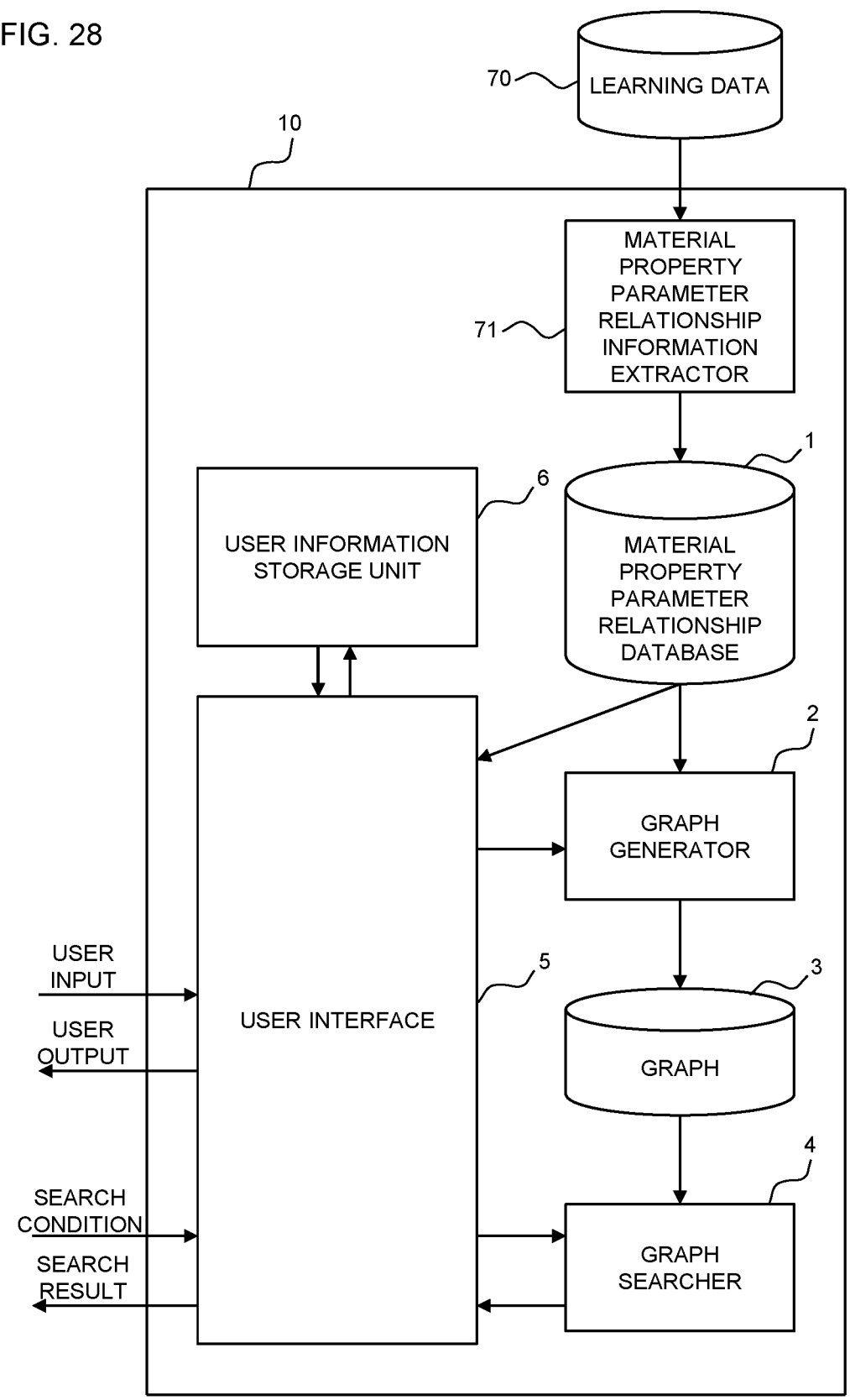
FIG. 28 is a block diagram illustrating a configuration example of a search system according to a seventh embodiment.
Figure 29:
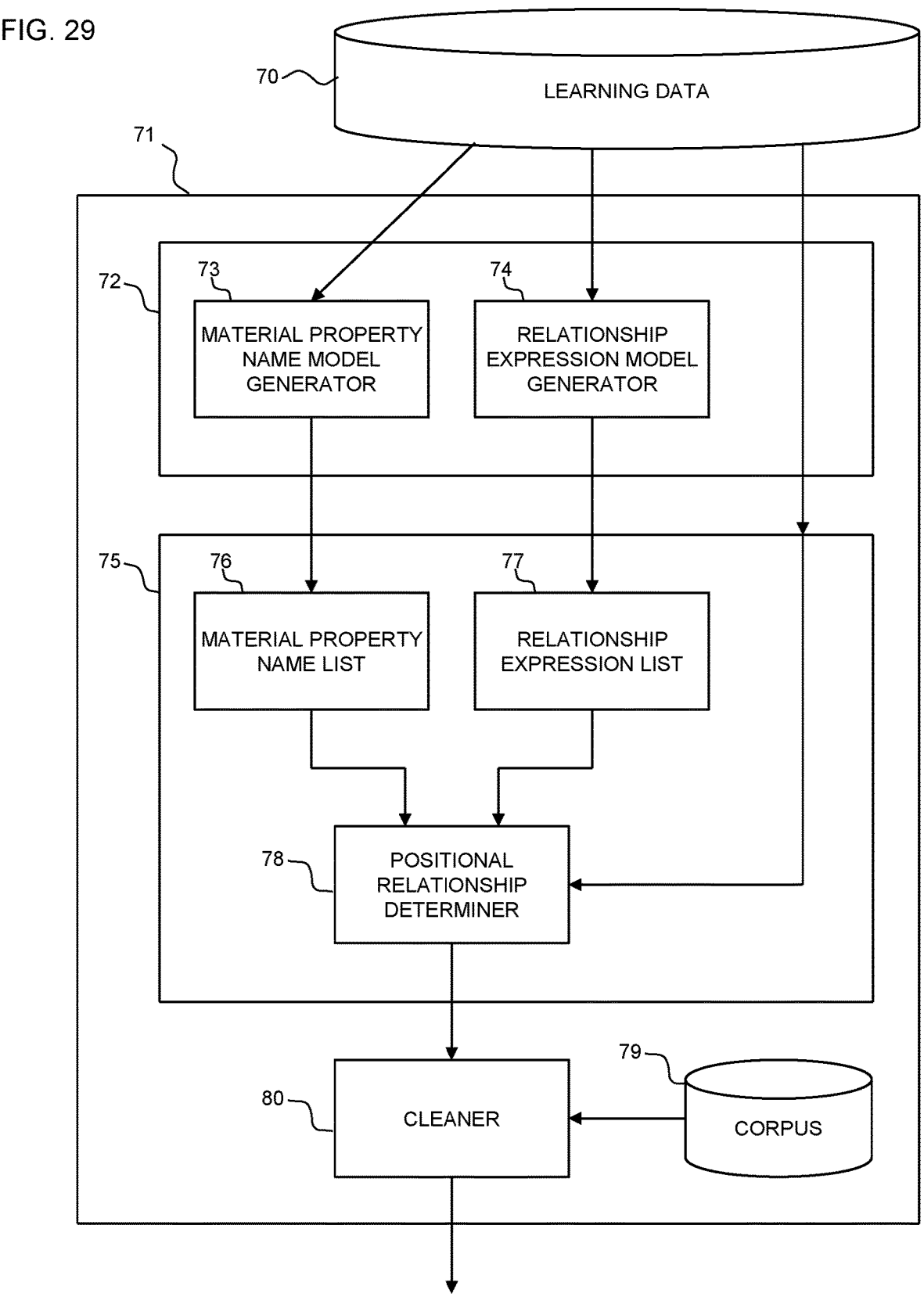
FIG. 29 is a block diagram illustrating a configuration example of a material property parameter relationship information extractor.

The search system of [1] further includes a material property parameter relationship information extractor (71). The material property parameter relationship data extractor includes a learning model generator (72) and a relationship extractor (75) (FIGS. 28 and 29).

The learning model generator generates a material property name model and a relationship expression model as learning models (73, 74) from supplied learning data and supplies the generated leaning models to the relationship extractor.

The learning data includes document data that defines material property names and their relationships, and the document data is input to the relationship extractor. The relationship extractor extracts a triple by using a material property name list created from the material property name model and a relationship expression list created from the relationship expression model, and based on a positional relationship among the material property names and the relationship expression in the input document data. The triple includes two material property names corresponding to a material property parameter pair having a causal relationship and a relationship expression representing the relationship therebetween. The relationship extractor then outputs the triple as output data. Here, the learning data input to the learning model generator (72) and the learning data input to the relationship extractor (75) are basically different document data. The search system updates the contents of the database with the output data. The document data that defines the material property names and their relationships is, for example, a textbook document. Learning data more preferably includes headings of a scientific terminology dictionary listing accurate material property names, an index of a data handbook, etc., besides such document data that defines the material property names and their relationships.

In this manner, management burden of updating the material property parameter relationship database (1) can be reduced.

[8] Addition of Cleaner to Material Property Parameter Relationship Information Extractor In [7], the material property parameter relationship information extractor further includes a cleaner (80) to which a corpus (79) is input (FIG. 29).

The cleaner removes, based on the corpus, triples that have been determined not to indicate a relationship among material property parameter pairs from the triples extracted by the relationship extractor to obtain the output data.

In this manner, management burden on the data reliability when updating the material property parameter relationship database (1) can be reduced.

[9] Search Method Including User Information Storage Unit

Figure 25:
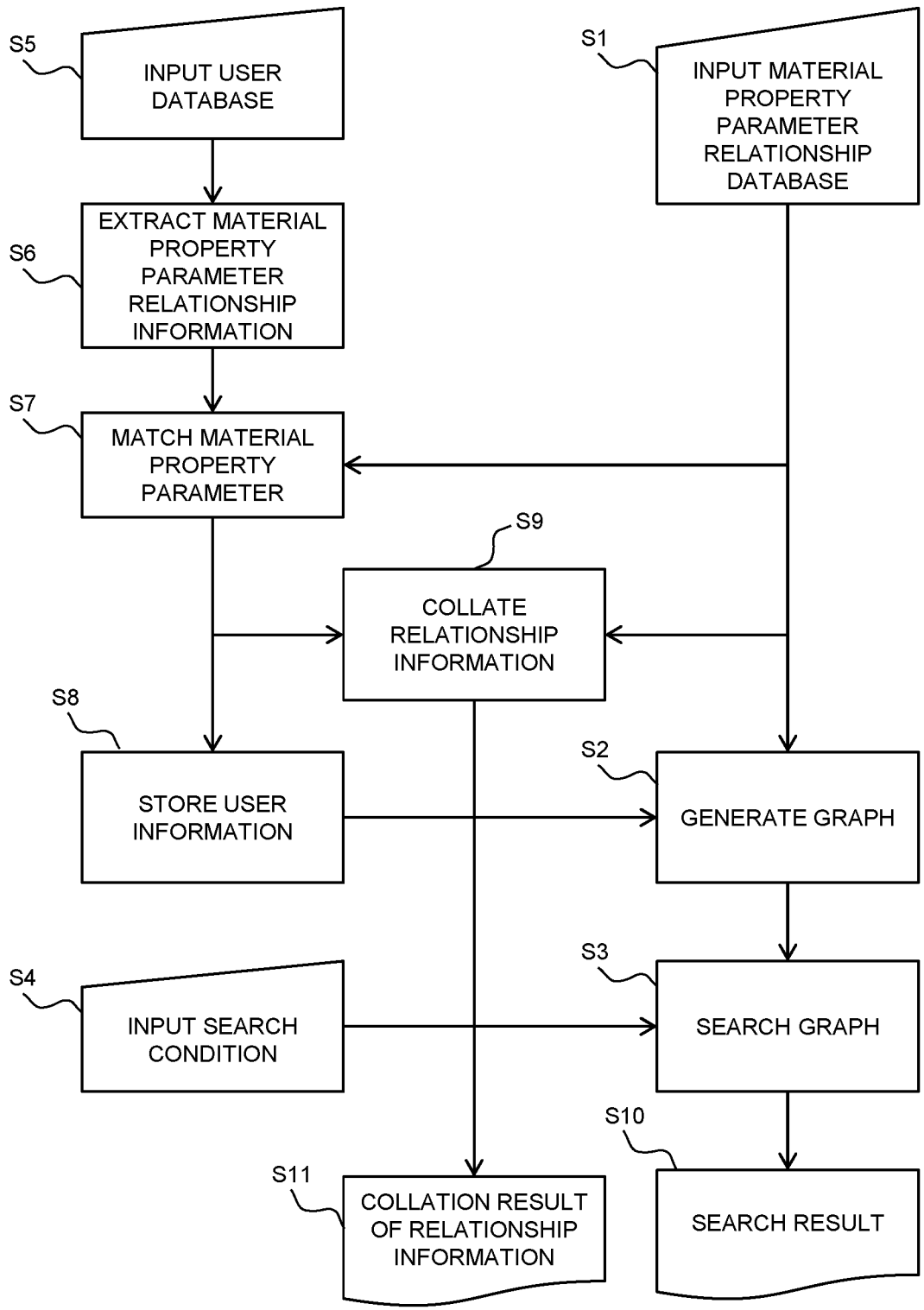
FIG. 25 is a flowchart illustrating the configuration example of the search method according to any of the second to fourth embodiments.

A typical embodiment of the invention is a search method including a graph generation step (S2) for generating a graph from a first database (S1) and a graph search step (S3), and is configured as follows (FIG. 25).

The first database stores a plurality of first parameter pairs of material property parameters having mutual relationships.

The graph is a graph in which a plurality of material property parameters included in the first parameter pair are nodes and in between the nodes corresponding to the first parameter pair is an edge.

In the graph search step, the graph is searched based on provided search conditions (including a query) and a search result is output (S10).

The search method further includes a database input step (S5).

In the database input step, a second parameter pair is extracted from an input second database and stored in the user information storage unit (S8) for each user identified based on a user identification information. Here, the user is not limited to a single person, and may be a user group consisting of a plurality of people.

Here, the second parameter pair is a pair of material property parameters having mutual relationships and is stored in the second database.

In this manner, knowledge of relationship information among material property parameters the users tangibly and intangibly have can be utilized effectively.

[10] Integration with User-Side Database

In the search method of [9] (FIG. 25), the graph generated in the graph generation step is a graph in which a plurality of material property parameters included in either of the first or the second parameter pair are nodes, and in between the nodes corresponding to the second parameter pair in addition to the first parameter pair is an edge.

In this manner, the relationship information among the material property parameters that users uniquely have can be utilized effectively.

[11] Integration with User-Side Database; Parameter Name Matching

The search method of [10] further includes a material property parameter relationship information extraction step (S6) and a material property parameter matching step (S7) (FIG. 25).

In the material property parameter relationship information extracting step, a plurality of second material property parameter names are extracted from the second database. In the material property parameter matching step, a thesaurus is referred to, the plurality of second material property parameter names are collated with the plurality of first material property parameter names stored in the first database, and if they differ from each other, the second material property parameter names are changed to the first material property parameter names for the matching of the names of the material property parameters.

In this manner, appearance inconsistency such as a difference in expression between the relationship information that users uniquely have among the material property parameters and the relationship information that the search system side has as user-independent common information can be removed, and information users have can be used more effectively.

[12] Integration with User-Side Database; Collation of Relationship Information

The search method of [11] further includes a relationship information collation step (S9) (FIG. 25).

In the relationship information collating step, pieces of relationship information about the same pair of material property parameters are collated between the first parameter pair and the second parameter pair, and a collation result is output (S11).

In this manner, the users can verify correctness, completeness, etc. of the relationship information among the material property parameters they uniquely have.

[13] Maintenance and Management of Search History

Figure 27:
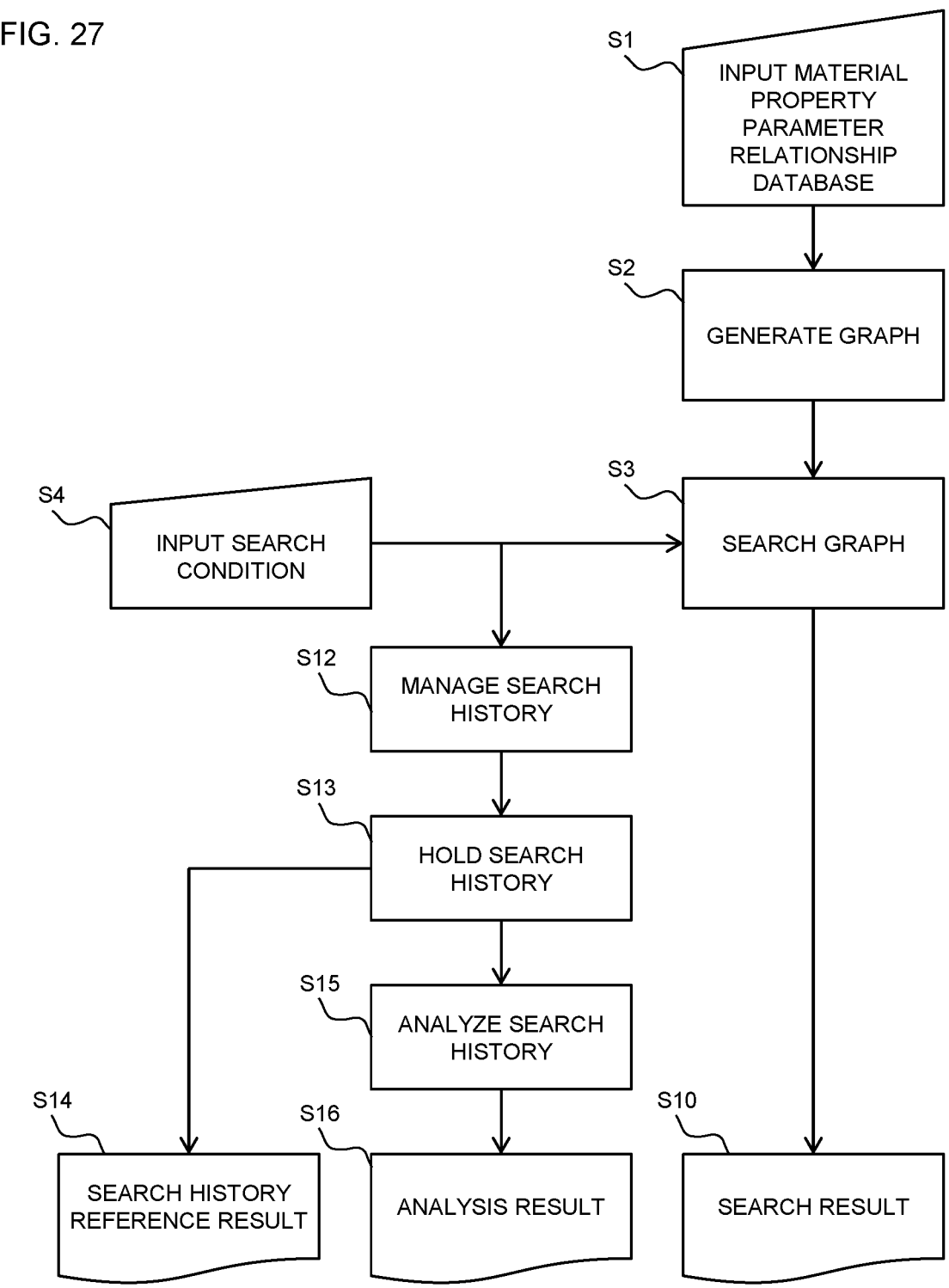
FIG. 27 is a flowchart illustrating the configuration example of the search method according to any of the fifth and sixth embodiments.

A typical embodiment of the invention is a search method including a graph generation step (S2) for generating a graph from a database (51) and a graph search step (S3), and is configured as follows (FIG. 27).

The database stores a plurality of parameter pairs of material property parameters having mutual relationships.

The graph is a graph in which a plurality of material property parameters included in the parameter pair are nodes and in between the nodes corresponding to the parameter pair is an edge.

In the graph search step, the graph is searched based on a search condition (including a query) provided in the search condition input step (S4) and a search result is output (S10).

The search method further includes a search history management step (S12).

In the search history management step, at least a search condition among the search condition provided in the search condition input step and the search result corresponding thereto is stored in the search history holder (S13) as a search history for each user identified based on the user identification information. Users authorized based on the user identification information are allowed to refer to the search history.

In this manner, the user can refer to the search history of him/herself or other users who authorized him/her to refer to the search history, and can provide appropriate feedback to his/her own search policy to improve search efficiency.

[14] Analysis of Search History

The search method of [13] further includes a search history analysis step (S15) (FIG. 27).

In the search history analysis step, the search history held in the search history holder is analyzed and an analysis result is presented to the user (S16).

In this manner, the users can obtain knowledge from their own search history and use the knowledge in their future searches.

Figure 30:
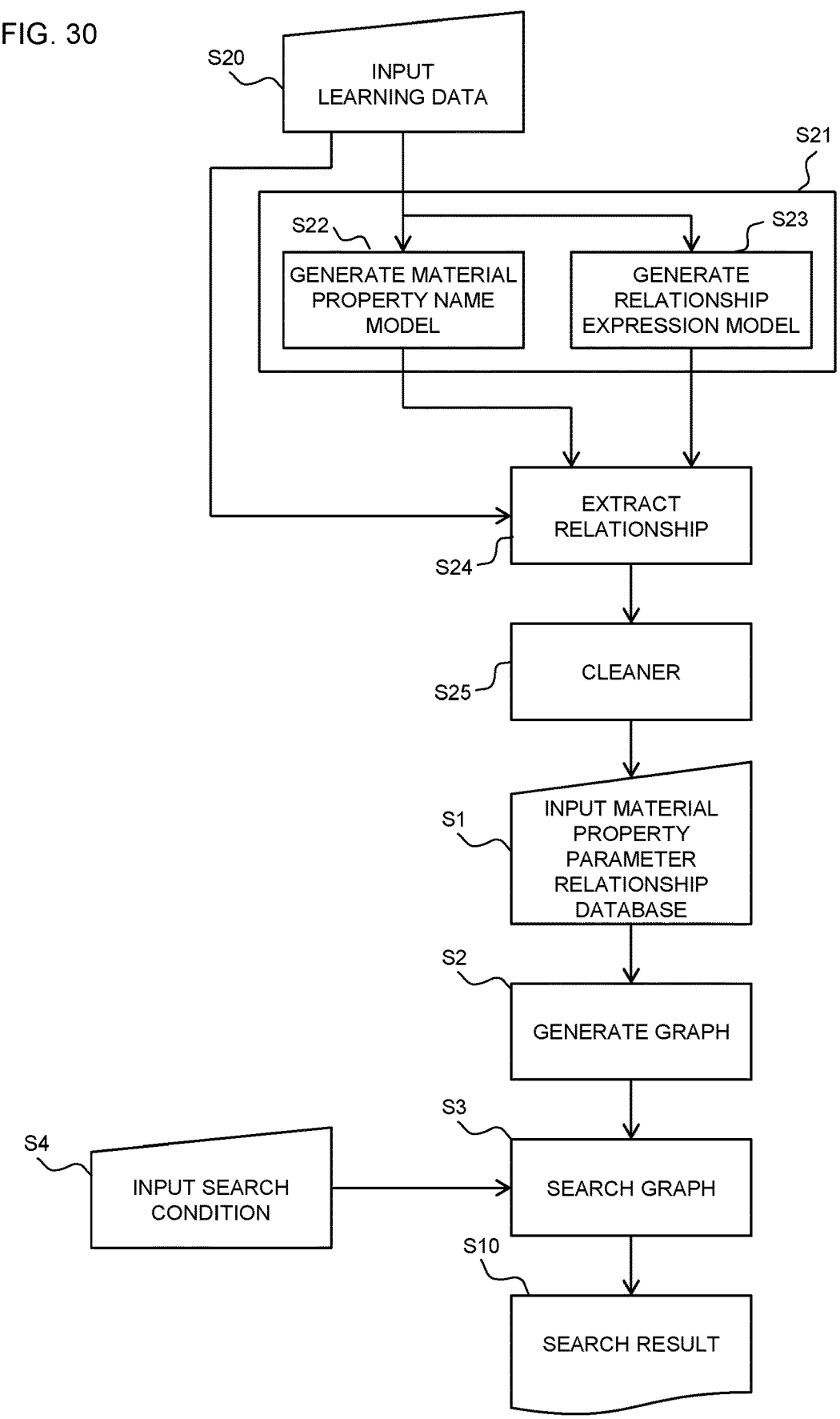
FIG. 30 is a flowchart illustrating the configuration example of the search method according to the seventh embodiment.

[15] Search Method Including Material Property Parameter Relationship Data Extraction Step A typical embodiment of the invention is a search method including a graph generation step (S2) for generating a graph from a database (51) and a graph search step (S3), and is configured as follows. (FIG. 30).

The database stores a plurality of parameter pairs of material property parameters having mutual relationships. The graph is a graph in which a plurality of material property parameters included in the parameter pair are nodes and in between the nodes corresponding to the parameter pair is an edge. In the graph search step, the graph is searched based on provided search conditions (including a query) and a search result is output (S10).

The search method further includes a learning model generation step (S21) and a relationship extraction step (S24).

The learning model generator generates a material property name model and a relationship model as learning models (S22, S23) from supplied learning data (S20) and supplies the generated models to the relationship extraction step.

The learning data includes document data that defines material property names and their relationships, and the document data is input to the relationship extracting step. In the relationship extraction step, a triple is extracted by using a material property name list created from the material property name model and a relationship expression list created from the relationship expression model, and based on the positional relationship among the material property names and the relationship expression in the input document data. The triple includes two material property names corresponding to a material property parameter pair having a causal relationship and a relationship expression representing the relationship therebetween. The triple is then output as output data.

In the search method, contents of the database are updated with the output data. The document data that defines the material property names and their relationships is, for example, a document such as a textbook. Learning data more preferably includes headings of a scientific terminology dictionary listing accurate material property names, an index of a data handbook, etc., besides such document data that defines the material property names and their relationships.

In this manner, management burden of updating the material property parameter relationship database (1) can be reduced.

[16] Addition of Cleaning Step

It is more preferable that the search method of [15] further includes a cleaning step (S25) in which a corpus is input (FIG. 30).

In the cleaning step, based on the corpus, triples determined not to indicate the relationship between material property parameter pairs are removed from the triples extracted in the relationship extraction step to obtain the output data.

In this manner, management burden on the data reliability when updating the material property parameter relationship database (1) can be reduced.

2. Details of the Embodiments

The embodiments will be described in more detail.

First Embodiment

FIG. 1 is a block diagram illustrating a configuration example of a search system according to the first embodiment.

The search system 10 includes a material property parameter relationship database 1 that stores relationships among material property parameters, a graph generator 2, a graph searcher 4, and a user interface 5.

The material property parameter relationship database 1 stores a plurality of pairs of material property parameters having mutual relationships. Here, pairs of material property parameters having mutual relationships are not limited to those based on scientific evidence-based relationships, i.e., those based on theoretically explained relationships: those known to have mutual relationships due to obvious correlation found from experimental data may also be included in the pairs of material property parameters even if they have not been theoretically explained or has not been formulated. Besides formulated relationships like theorems and formulae, the "theoretically explained relationships" may widely include semi-quantitative or qualitative relationships where the semi-quantitative relationships are explained by presence/absence of correlation or positive/negative of correlation coefficients (i.e., while one of the correlation coefficients increases, the other also increases or decreases, etc.). Here, it is not necessary for relationships known in any field to be excluded, and pairs of material property parameters of which relationships are known in every field may be included.

The graph generator 2 generates a graph 3 in which a plurality of material property parameters stored in the material property parameter relationship database 1 are nodes, and in between the nodes corresponding to the material property parameters pairs having mutual relationships is an edge.

The user interface 5 can provide a search condition such as a query to the graph searcher 4 as described above, and output a search result to the outside. The user interface 5 is not limited to a human interface, and may be an interface with another database or with a search system.

The graph searcher 4 searches the graph 3 based on provided search conditions via the user interface 5, and outputs search results. Various path search methods based on mathematical algorithms such as graph theory can be applied to the graph searcher 4.

In this manner, the search system 10 can search for an unknown combination of material property parameters having a significant relationship based on already known relationships among arbitrary combinations of a plurality of material property parameters. The material property parameter pairs which are stored in the material property parameter relationship database 1 and have mutual relationships may desirably be collected from as many technical fields as possible. In the present invention, the relationships of material properties collected from many technical fields are collectively expressed in a single graph 3, which enables a user to conduct a path search in the graph 3. Here, a "single graph" means a range having a plurality of nodes and a plurality of edges connecting the nodes, in which all the nodes are directly or indirectly connected by the edges. A single graph may be a collection of a plurality of graphs (sometimes referred to as subgraphs). With the expression using the graph 3, a user can conduct a path search based only on presence or absence of edges irrespective of in what technical field the relationship corresponding to the edge has been known. Therefore, a search can be conducted across many fields. Thus, an unknown combination of material property parameters having a significant relationship can also be found in addition to already known relationships of material property parameters. By integrating relationships that have been known only in different technical fields and expressing them in a graph, a user can conduct a path search in the entire graph irrespective of in what technical field all the relationships have been known. Therefore, there is a possibility of discovering new relationships among unknown material property parameters.

The search system 10 further includes a user information storage unit 6, and, via the user interface 5, makes the user information storage unit 6 hold data (user data) input by the user as user input for each user identified based on the user identification information. The search system 10 may be configured such that information related to the user data input by the user is output from the search system 10.

The user data may be any knowledge related to the relationship information among the material property parameters that the user tangibly and intangibly has. The user data may be, for example, relationship information among material property parameters that the user found empirically or the like, but not theoretically explained. More details will be described in second to fourth embodiments. The user data can be a series of search conditions input by the user. More details will be described in a fifth embodiment. Here, the "user" is not limited to a single person, and may be a user group consisting of a plurality of people. For example, a plurality of users engaged in the same research and development project may be organized as a single user group of which members may share the user data.

In this manner, knowledge of relationship information among material property parameters the users tangibly and intangibly have can be utilized effectively.

<Hardware/Software Embodiments>

The search system 10 of the invention is constructed to function as software on a hardware system including a storage device and a computer.

Figure 2:
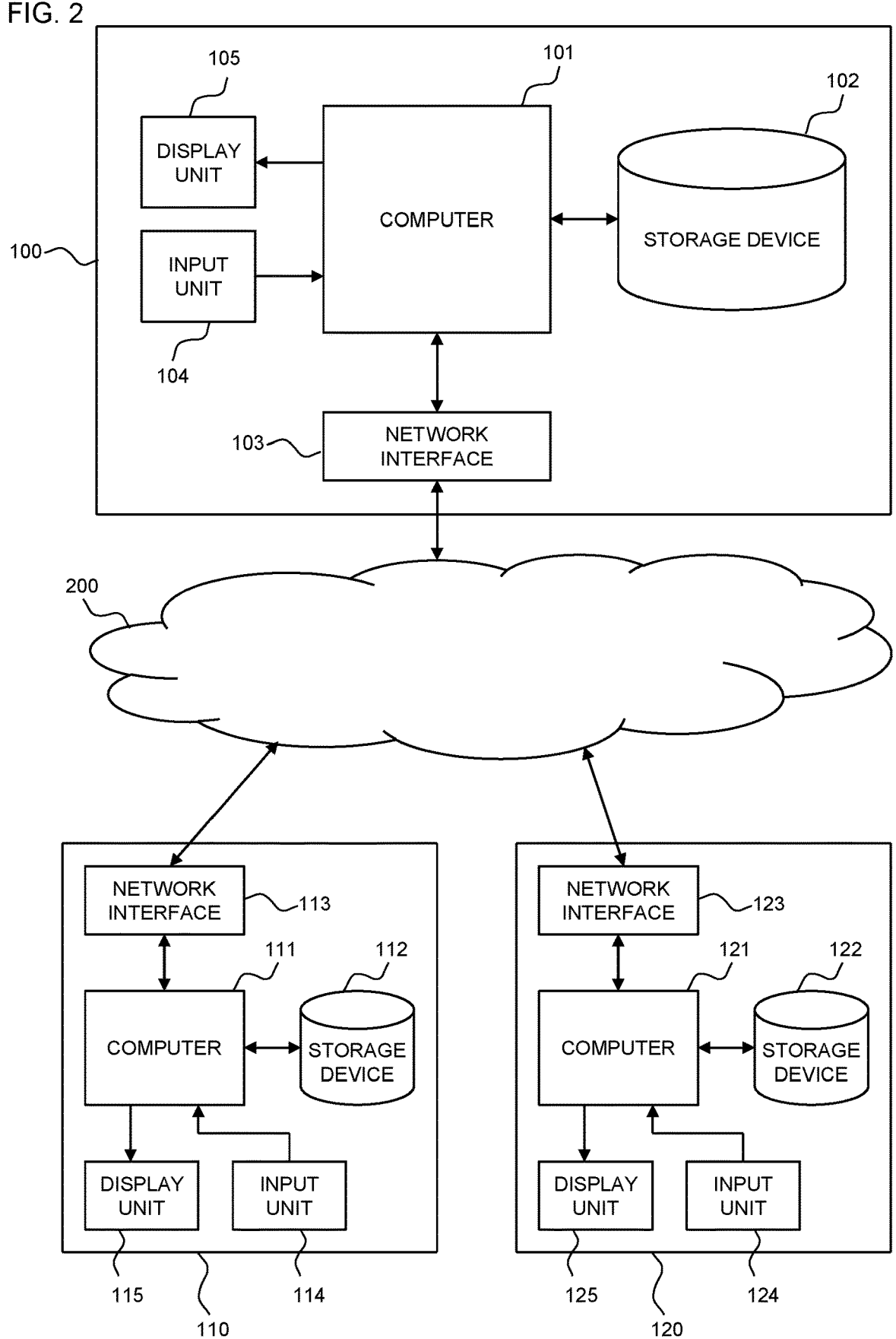
FIG. 2 is a block diagram illustrating an example of a hardware system in which a search system and a search method of the invention are to be implemented.

FIG. 2 is a block diagram illustrating an example of a hardware system in which the search system 10 of the invention is implemented.

A server 100 and user-side workstations 110 and 120 are connected to a network 200 such as the Internet. The server 100 includes a computer 101, a storage device 102, a network interface 103, an input unit 104, and a display unit 105.

If the input and output via the network 200 is sufficient, provision of the input unit 104 and the display unit 105 may be optional. The user-side workstations 110 and 120 also include computers 111 and 121, storage devices 112 and 122, network interfaces 113 and 123, input units 114 and 124, and display units 115 and 125, respectively. The search system 10 may also be implemented without being connected to the network 200. The network interface 103 may be omitted from the server 100, and the entire search system 10 of the invention may be implemented in the computer 101, the storage device 102, the input unit 104, and the display unit 105.

The material property parameter relationship database 1 of the search system 10 is stored in the storage device 102. The graph generator 2 is software that operates on the computer 101. The graph 3 generated by the graph generator 2 is stored in the storage device 102 as intermediate data and is used as input data of the graph searcher 4 implemented as software in the computer 101.

The user interface 5 of the search system 10 is implemented by using the input units 114 and 124 and the display units 115 and 125, respectively, of the user-side workstations 110 and 120. Search conditions are provided from the user-side workstations 110 and 120 to the graph searcher 4 via the user interface 5, and search results are returned. The user information storage unit 6 may be implemented in the storage devices 112 and 122 of the user-side workstations 110 and 120, or may be implemented in the storage device 102 of the server 100.

The graph searcher 4 may be implemented as software in the computers 111 and 121 of the user-side workstations 110 and 120 instead of or in addition to the server 100. Here, the graph 3 is supplied from the server 100 in response to a request from the user-side workstations 110 and 120. The graph 3 may be configured to be downloaded in advance and stored in the storage devices 112 and 122 of the workstations 110 and 120 before the user conducting the path search. In this manner, the path search process by the graph searcher 4 is speeded up. Especially when many users are to conduct the graph search process at the same time, concentration of processing load on the server 100 can be prevented.

Further, the graph generator 2 may also be implemented as software in the computers 111 and 121 of the user-side workstations 110 and 120. Also in this case, when many users are to conduct the graph search process at the same time, concentration of processing load on the server 100 can be prevented.

The search system 10 according to the first embodiment will be described in more detail.

<Directed Graph/Undirected Graph>

Figure 3:
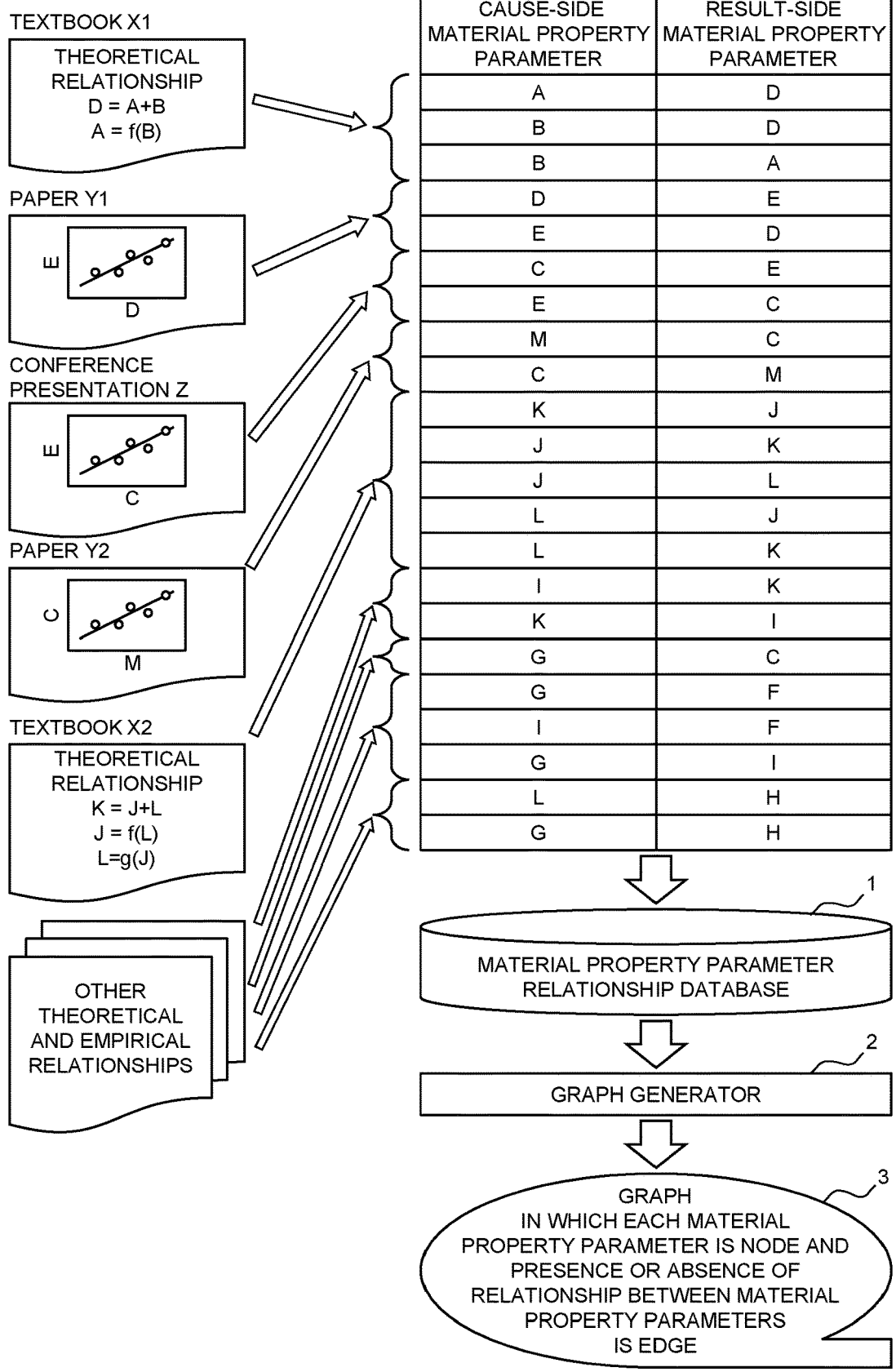
FIG. 3 is an explanatory diagram illustrating a configuration example of a database of the search system according to the first embodiment.

FIG. 3 is an explanatory diagram illustrating a configuration example of the material property parameter relationship database 1. As an example, an input form 11 of the database 1 is illustrated. The input form 11 is a table in which a pair of material property parameters having mutual relationships are input to rows. The first column is allocated to the cause-side material property parameters, and the second column is allocated to the result-side material property parameters. Although it is not necessary to separate the material property parameters into the cause-side and the result-side, such separation is advantageous in that relationships having directionality in causality can also be expressed. When a relationship is bidirectional, the relationship is described by using two rows with the cause-side material property parameters and the result-side exchanged.

As illustrated in FIG. 3, when "D=A+B" is formulated as a theoretical relationship in a textbook X1, the cause-side material property parameters are A and B, and the result-side material property parameter is D (the second row and the third row), when "A=f(B)" is formulated, f is a function of B as input and A as output, and when an inverse function is undefinable, the cause-side material property parameter is B and the result-side material property parameter is A (the fourth row). When an article Y1 shows data (graph) indicating material property parameters D and E are in close correlation, the relationship is input to a fifth row and a sixth row. Similarly, when a conference presentation Z shows data (graph) indicating material property parameters C and E are in close correlation, the relationship is input to a seventh row and an eighth row. Similarly, hereinafter, the relationship between material property parameters M and C shown in an article Y2 is input to a ninth row and a 10th row, the relationships between material property parameters K and J, K and L, J and L, and L and J, derived from a theoretical formula shown in a textbook X2 are input to from an 11th to a 15th rows, and the relationships between the material property parameters I and K, G and C, G and F, G and I, I and F, L and H, and G and H, which are known theoretically or empirically, are input to a 16th to a 23rd rows.

The relationships between the plurality of material property parameter pairs input to the input form 11 are taken into the computer and stored as the material property parameter relationship database 1. The graph generator 2 generates the graph 3 based on the database 1 as input, in which graph each material property parameter corresponds to a node, and presence/absence of mutual relationship among material property parameters corresponds to an edge. In FIG. 3, the input form 11 and the material property parameter relationship database 1 are depicted as clearly distinguished from each other. However, the input form 11 itself may be referred to as the material property parameter relationship database 1. This is because if one set of two material property parameters (pairs) described in the same row of the input form 11 is to be defined as two nodes and an edge is to be defined therebetween, the information is substantially equivalent to a graph.

The textbooks X1 and X2, the articles Y1 and Y2, and the conference presentation Z are desirably textbooks, articles, conference presentations etc. in completely different fields. Thus, users can trace the relationship between the material property parameters A and D known in the textbook X1, the relationship between the material property parameters D and E known in the article Y1, the relationship between the material property parameters E and C known in the conference presentation Z, the relationship between the material property parameters C and M known in the article Y2, and the relationship between the material property parameters M and J known in the textbook X2 in this order to obtain new knowledge that the material property parameters A and J have a relationship. The new relationship obtained here is a relationship that can exist merely mathematically and whether it is an actually valid relationship may have to be determined after physical evaluation. However, finding such a relationship is valuable at least in providing notice to researchers who are users.

Figure 4:
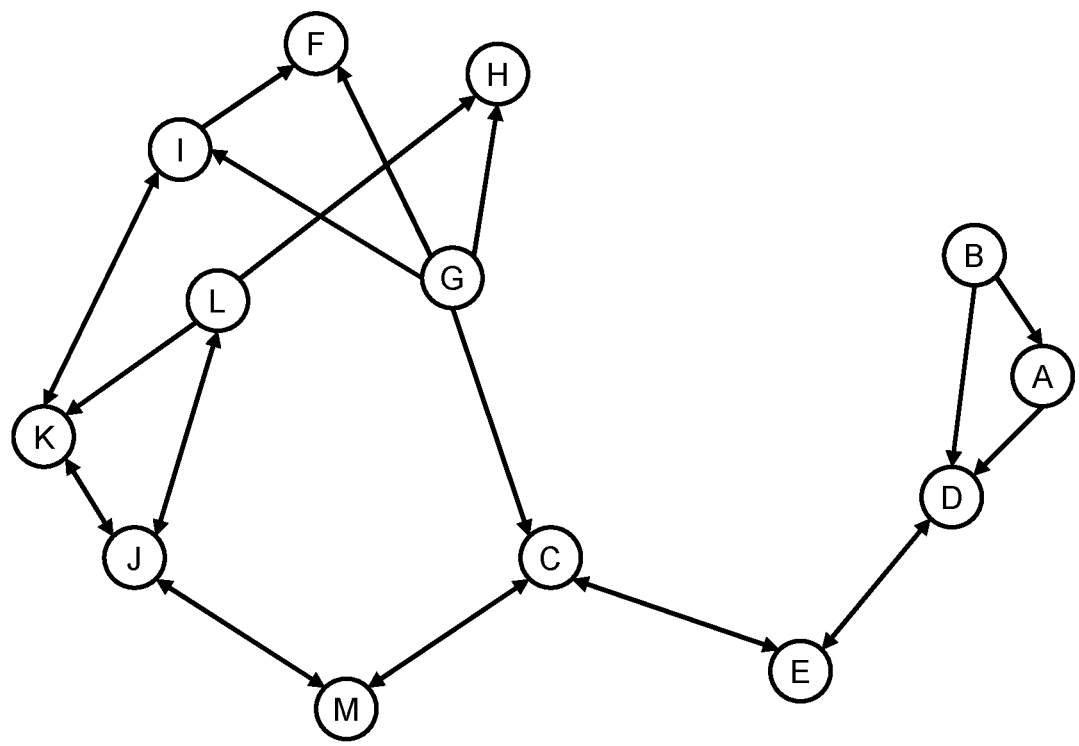
FIG. 4 is an explanatory diagram illustrating an example of a generated graph (a directed graph).
Figure 5:
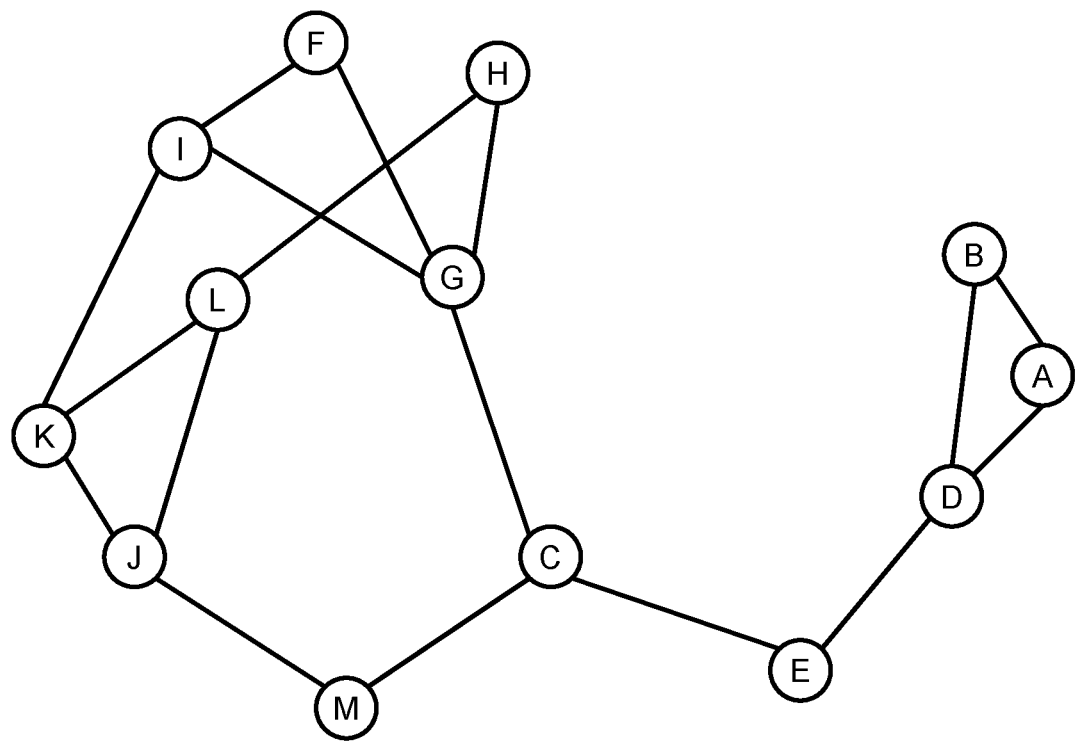
FIG. 5 is an explanatory diagram illustrating an example of a generated graph (an undirected graph).

FIG. 4 illustrates an example in which the generated graph 3 is a directed graph. The graph 3 may be an undirected graph. FIG. 5 illustrates an example in which the generated graph 3 is an undirected graph.

<Path Search>

Figure 6:
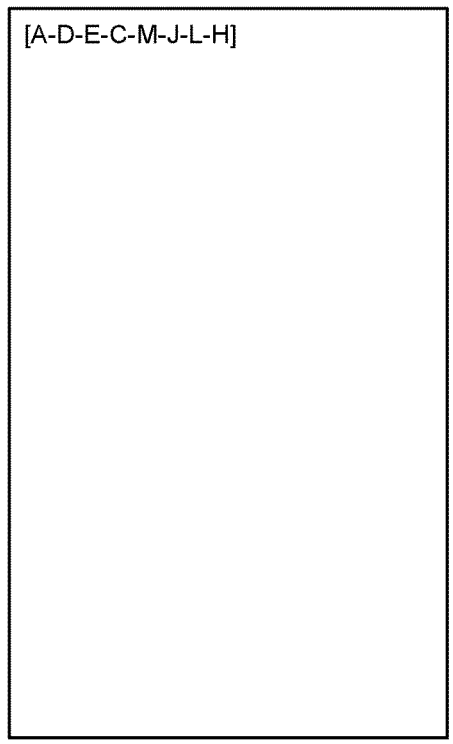
FIG. 6 is an explanatory diagram illustrating an example of a path search result of a directed graph.
Figure 7:
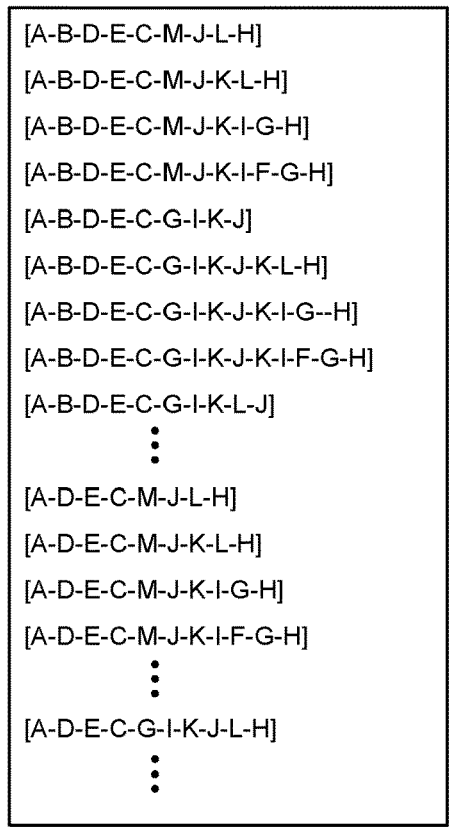
FIG. 7 is an explanatory diagram illustrating an example of a path search result of an undirected graph.

The graph searcher 4 conducts a path search in the graph 3 under a provided search condition (including a query). For example, if a user wants to know the presence or absence of a causal relationship with the material property parameter A being a cause side and H being a result side, the user provides the graph searcher 4 with a search condition that a node A is a start point and a node H is an end point and makes the graph searcher 4 execute a path search. As a result, if the graph is a directed graph as illustrated in FIG. 4, a path search result as illustrated in FIG. 6 is obtained, and if the graph is an undirected graph as illustrated in FIG. 5, a path search result as illustrated in FIG. 7 is obtained.

The search condition to be provided to the graph searcher 4 may be arbitrarily changed in addition to setting the start point and the end point. For example, an end point and the number of nodes to reach the end point may be specified as a search condition, and all the paths of which length to the end point is within the number of nodes may be listed in the graph searcher 4. In this manner, material property parameters having a relatively strong relationship with a specific material property parameter can be comprehensively listed.

FIG. 8 is an explanatory diagram illustrating queries, and FIG. 9 is an explanatory diagram illustrating display options. The display option can be specified together with a query to specify a display mode of a search result by the query and display of additional information.

The query 1 "search paths from A to B" is a query indicating a search for paths starting from the node A corresponding to the material property parameter A and ending at the node B corresponding to the material property parameter B. For example, display options for search results such as option 1 "all paths," option 2 "shortest path," and option 3 "within p paths" illustrated in FIG. 9 can be specified together with the query 1.

The display option 1 "all paths" is an option for displaying all the paths that satisfy the search condition "starting from the node A and ending at the node B" specified by the query.

The display option 2 "shortest path" is an option for displaying the shortest path among all the paths that match the search conditions specified by the query. Further, a display option for displaying q paths in the order from the shortest, such as "shortest q paths" may be added.

The display option 3 "within p paths" is an option for displaying the paths having a predetermined length p or shorter among all the paths that match the search conditions specified by the query. An option that enables a user to specify a range such as "p1 or longer and p2 or shorter" may be added.

In addition, display options for the search result, such as option 6 "common paths with from A to X," option 7 "uncommon paths with from A to X," option 8 "common paths with from Y to B," option 9 "uncommon paths with from Y to B," option 10 "around the end node within cl paths," and option 11 "similar paths" can be specified.

The display option 6 "common paths with from A to X" is an option for displaying a path that is common to the paths having a node A as a common start point and reaching different end points X among all the paths that satisfy the search condition "starting from node A and ending at node B" specified by the query.

The display option 7 "uncommon paths with from A to X" is an option for displaying a path that is uncommon to the paths having a node A as a common start point and reaching different end points X among all the paths that satisfy the search condition "starting from node A and ending at node B" specified by the query.

The display option 8 "common paths with from Y to B" is an option for displaying paths that are common to the paths having the node B as a common end point from different start points Y among all the paths that satisfy the search condition "starting from the node A and ending at the node B" specified by the query.

The display option 9 "uncommon paths with from Y to B" is an option for displaying paths that are uncommon to the paths having a node B as a common end point from different start points Y among all the paths that satisfy the search condition "starting from the node A and ending at the node B" specified by the query.

The display option 10 "around the end node within cl paths" is an option for displaying an area around the end node B specified by the queries 1 to 4 together with the search result within the range of the path length cl or shorter.

The display option 11 "similar paths" is an option for displaying another search condition with more common paths among paths having different start points and different end points among all the paths that satisfy the search condition "starting from the node A and ending at the node B" specified by the query. The number of common paths is specified in an arbitrary manner.

Although not illustrated in FIG. 9, other display options may be added. For example, an option for displaying surround around the end point node that satisfies a predetermined path length condition (i.e., path length p or shorter, p1 or longer and p2 or shorter, and p2 or longer) may be added with the end point node B as a further start point.

The length of the path is herein described as the number of nodes or edges a path passes through from the start point node to the end point node. Alternatively, a length attribute may be given to edges so that the path length is defined as the total length of edges that the path passes through. Unless otherwise specified, this interpretation applies to the entire specification of the path length.

The query 2 "search paths from A to B including D in the paths" and the query 3 "search paths from A to B excluding D in the paths" are queries for indicating a search for a path that includes or does not include a node D corresponding to a material property parameter D among the paths starting from the node A and ending at the node B. With these queries, display options about the search result such as the option 1 "all paths," the option 2 "shortest path," and the option 3 "within p path" can be specified at the same time.

The query 4 "search paths from A to B within n paths" is a query indicating a search for a path having a predetermined length n or shorter among the paths starting from the node A and ending at the node B. With this query, display options about the search result such as the option 1 "all paths," the option 2 "shortest path," and the option 3 "within p path" can be specified at the same time. This query differs from the display option 3 "within p path" in that the search result is limited by the path length. In addition, the display option 4 "difference within n-paths/[other opt.]" can be specified. The display option 4 "difference within n-paths/[other opt.]" is an option for displaying the difference from the search result limited by specifying other display options.

The query 5 "search paths around M within m paths" is a query for outputting a path or a subgraph having a length of m nodes or shorter around the node M corresponding to the material property parameter M as a search result. In this query, it does not matter whether the node M is the start point or the end point. The query 6 "search paths from M within m paths" or "to M within m paths" is a query for outputting paths or a subgraph having a length of m nodes or shorter with the start point being the node M or the end point being node M as a search result.

The query 7 "search paths around M within m1-m2 paths" is a query for outputting paths or a subgraph having a length of m1 nodes or longer and a length of m2 nodes or shorter around the node M corresponding to the material property parameter M as a search result. In this query, it does not matter whether the node M is the start point or the end point. The query 8 "search paths from M within m1-m2 paths" or "to M within m1-m2 paths" is a query for outputting a path or a subgraph having a length of m1 nodes or longer and m2 nodes or shorter around the node M with the start point being the node M or the end point being node M as a search result.

The option 12 "similar graph" may be specified as a display option for those queries 5 to query 8 for outputting a subgraph as a search result.

The display option 12 "similar graph" is an option for displaying another query whose search result is a graph similar to the subgraph which is the search result. The degree of similarity of the graphs may be specified in an arbitrary manner. For example, similarity generally used in the graph theory may be used as an index indicating the degree of similarity. When each node and each edge in a subgraph can be associated one to one between two subgraphs to be compared, it is defined that the two subgraphs are equal, i.e. have the maximum similarity. The similarity can be quantified by quantifying the number and attributes of nodes and edges that cannot be associated with each other and subtracting the obtained value from the maximum similarity.

The ways of providing the search conditions (queries) and display options described by quoting FIGS. 8 and 9 are mere examples, and may be implemented in arbitrary manners. For example, only a part of them may be implemented, changed to other queries or display options, or other queries or display options may be added.

<Edge with Reliability Information>

Reliability information of a relationship among material property parameter pairs can be added to an edge of the graph 3 as one of the attributes of the edge. A theoretically proved and widely recognized relationship is significantly reliable. However, regarding a relationship for which experimental data showing existence of correlation between two material property parameters has been obtained but data on additional experiments for confirming reproducibility has not been obtained, and a theoretical explanation explaining that relationship being merely a hypothesis, users may want to consider the reliability of such relationship to be low. Such reliability information may be additionally input to the database 1 so that the information is associated with the length of the edge in the graph 3, and is treated as a length of the path in the graph searcher 4, for example. For example, the length of an edge with high reliability is set to 1 and, as the reliability becomes lower, the longer edges like 2, 3, 4 and so on may be associated with lower reliability.

<Priority Determination>

When a plurality of path search results are to be output from the graph searcher 4, priorities are desirably given to these results.

Figure 10:
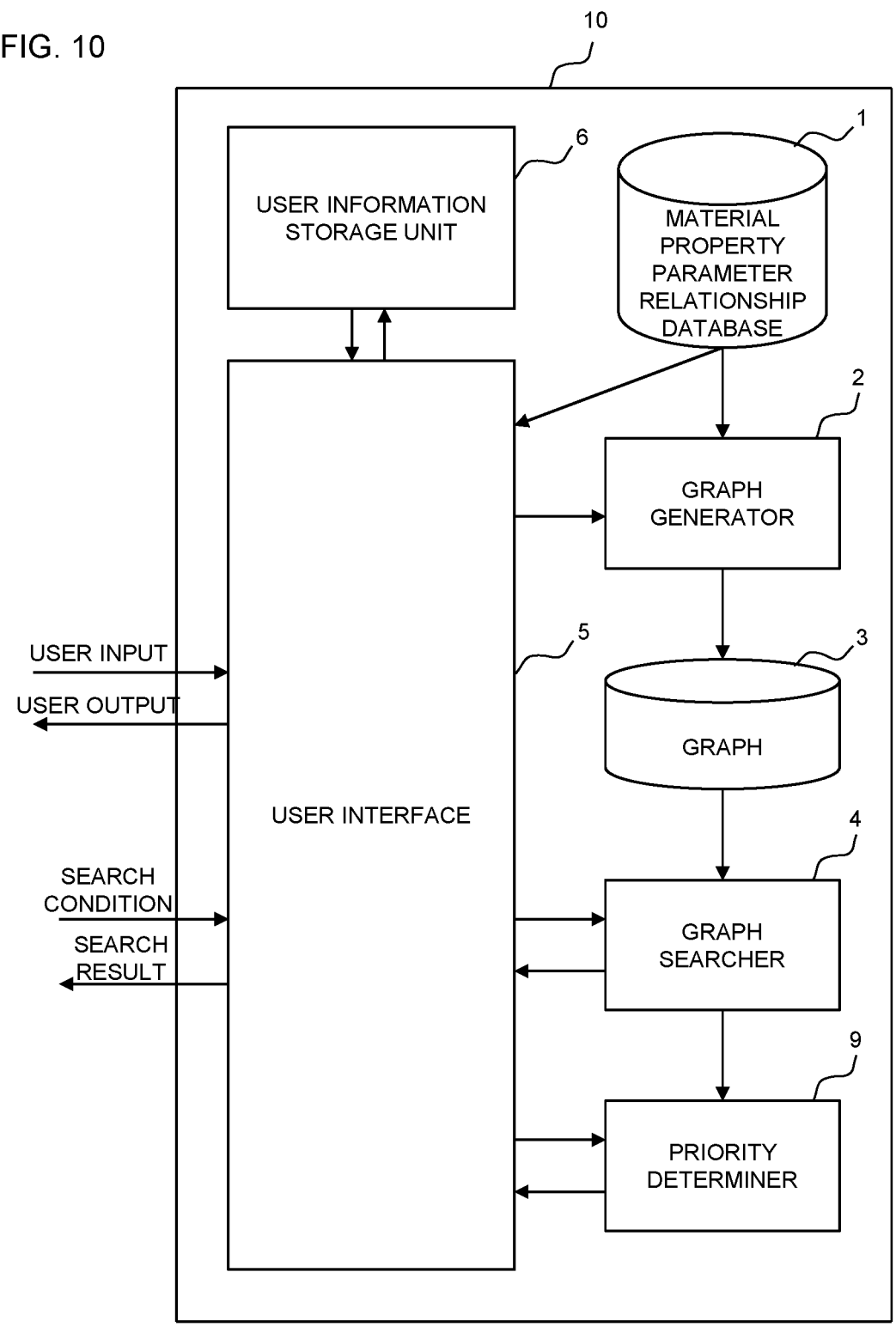
FIG. 10 is a block diagram illustrating a modified configuration example of the search system according to the first embodiment.

FIG. 10 is a block diagram illustrating a modified configuration example of the search system according to the first embodiment. The search system 10 further includes a priority determiner 9. The priority determiner 9 outputs the path search results, output from the graph searcher 4, with priority given thereto.

Evaluation items for determining priority are, for example, reliability, the number of edges, measurability of material property value, data volume in a database of material property values, and a value of material property. Two or more items may be considered for evaluation to determine the priority. Details of each item are as follows.

(a) Reliability: indicating whether a relationship is strictly theoretical, semi-quantitative, qualitative, or empirical.

(b) The number of edges: indicating the number of related material properties and a weighted amount corresponding thereto. Here, the number of related material properties is the number of arrows of the edges pointed toward and away from the node (an arrow pointed away from the node is indicated by +, toward is −), and the amount to be weighted is a quantified amount of an attribute related to the length and thickness of the arrow of the edge.

(c) Measurability of material property values: indicating any of the following: the material property value is measurable in principle and a measuring method therefor exists; the material property value is measurable in principle but measuring method therefore is unknown; or the material property value is unmeasurable.

(d) Data volume in the database of material property values: indicating the amount of data of the material property values stored in the database.

(e) Value of material property: indicating a material property value itself of the material property.

Of these, (a) is an attribute of an edge and each of (b) to (e) is an attribute of a node.

The evaluation method for determining the priority is roughly divided into two types: an item-specific evaluation method in which each of above items (b) to (e), which is an attribute of the node, is evaluated independently, and a combined evaluation method in which evaluation is executed for the combination of at least two of the above items (a) to (e). Each item is quantified and shown as a score.

The combined evaluation method can be divided into the following various courses depending on which evaluation item is emphasized.

(i) Reliability-oriented course: reliability is emphasized (ii) Control-oriented course: controllability of the material property parameter is emphasized by weighting the number of edges input to the node corresponding to the material property parameter to be controlled (iii) Measured value-oriented course: measurability of material property values is emphasized (iv) Data volume-oriented course: measurability of material property values is emphasized (v) Material property limitation course: the fact that the value of a predetermined material property parameter is a specific value or within a specific range is emphasized (vi) Universal course: a plurality of evaluation items are weighted almost evenly The weighted addition score is obtained by adding the weighted scores of the items each of which constitutes each course, and priority is determined in the order of the weighted addition scores.

<Conditional Relationships>

Presence/absence or details of relationships among material property parameter pairs may change under some conditions. For example, the tensile strength and the Vickers hardness are proportional to each other on condition that the materials are transition metal carbides. This is because the tensile strength of the transition metal carbides is determined by shear strength where the tensile strength is determined by the shear strength, the tensile strength and the Vickers hardness are in a proportional relationship. Also, there is a relationship between the tensile strength and the depth of the bonding potential on condition that the substance does not exhibit superplasticity. Therefore, in searching for a relationship between the material property parameters, it is necessary to determine presence/absence of a path and a length by taking such conditions into consideration.

In order to treat a conditional relationship of material property parameter pair, the material property parameter pair is defined in association with its condition in the material property parameter relationship database 1, and the graph generator 2 adds the condition as an attribute of an edge. The problem of conditional relationships can be solved by changing the graph searcher 4 to software in which a graph search algorithm capable of handling a conditional edge has been implemented. It is therefore possible to deal with the conditional relationship as it is without changing the configuration of FIG. 1.

Alternatively, the graph searcher 4 may be software in which a general graph search algorithm is implemented that is not preconditioned for graphs having conditional edges. Purely mathematical algorithms have been established for path searching of graphs, and software libraries implementing them have already been provided. Therefore, these can be applied to the graph searcher 4 of the invention as they are or with minimal design changes.

Figure 11:
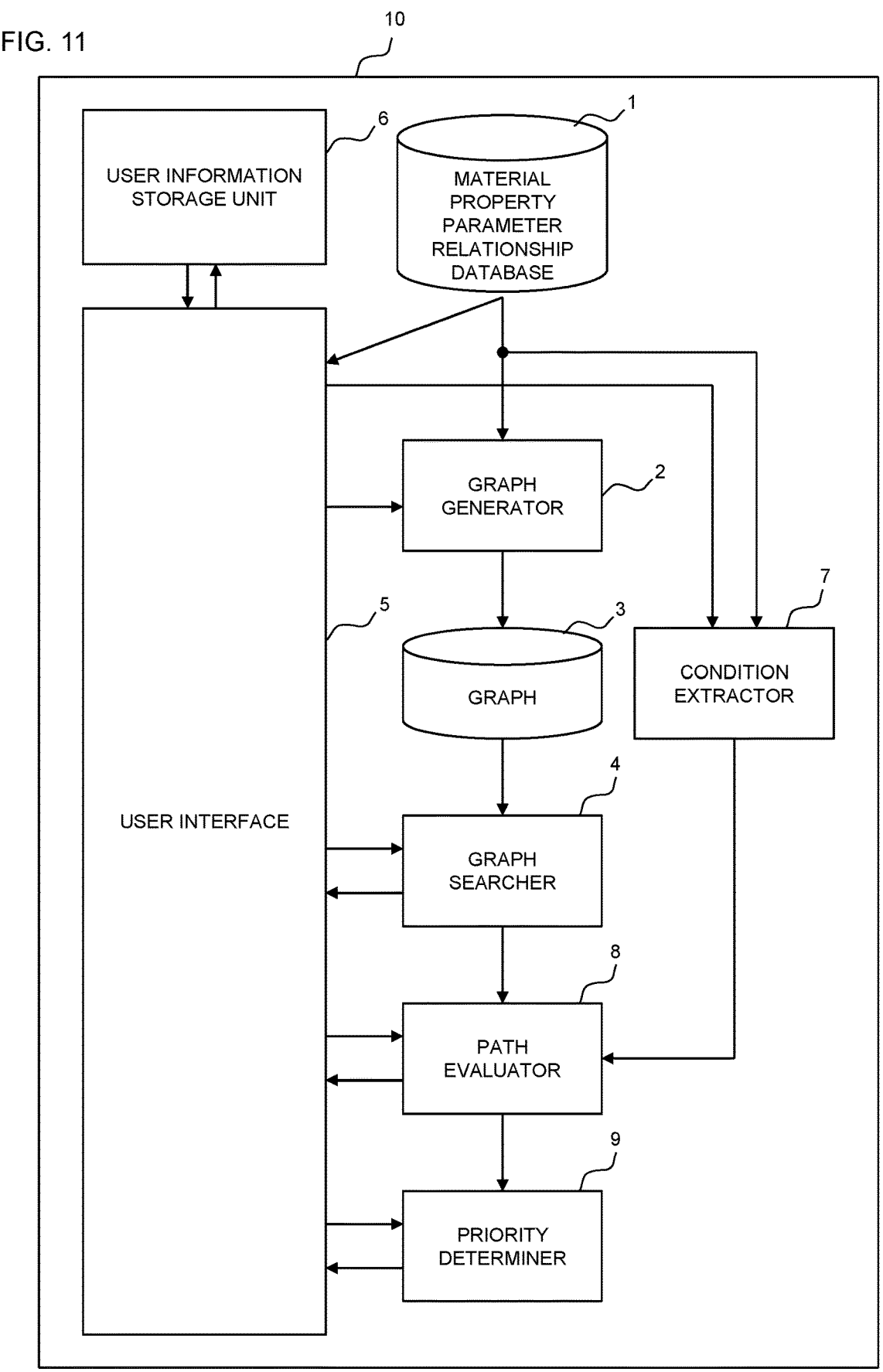
FIG. 11 is a block diagram illustrating a further modified configuration example of the search system according to the first embodiment.

FIG. 11 is a block diagram illustrating a further modified configuration example of the search system according to the first embodiment. The search system 10 further includes a condition extractor 7 and a path evaluator 8.

Regarding pairs for which conditions that define presence or absence of relationships exist among a plurality of pairs of material property parameters having mutual relationships, the conditions are further stored in the material property parameter relationship database 1. The condition extractor 7 extracts the condition from the material property parameter relationship database 1 in association with the edge (conditional edge) corresponding to the pair whose presence or absence of the relationship is defined by the condition. The graph searcher 4 executes a path search in the graph 3 and outputs a search result. Here, the presence or absence of the conditional edge is not considered. The path evaluator 8 determines whether the extracted path includes a conditional edge and determines whether the condition is satisfied regarding paths including a conditional edge. If the condition is not satisfied, the path evaluator 8 excludes the path from the result output from the graph searcher 4 and outputs the result as a search result.

Therefore, even such a complicated relationship that presence/absence of a relationship changes depending on a value of the material property parameter corresponding to the relationship or a value of another material property parameter can be included in a search range. On the other hand, the graph searcher 4 need not additionally have a function to search a graph including conditional edges, and general graph search software can be used in the same manner as in the first embodiment.

The priority determiner 9 functions in the same manner as the above-described modification described with reference to FIG. 10, but may be omitted.

<Input Form>

Evaluation items for determining priority, such as reliability, the number of edges, measurability of material property values, data volume in the database of material property values, the value of the material property, and the conditions described above may be input to the material property parameter relationship database 1 by adding items to the input form 11 illustrated in FIG. 3 if they are attributes of edges, and by using another input form if they are attributes of nodes.

FIG. 12 is an explanatory diagram illustrating a modified example of the input form 11. Compared with the example of the input form 11 illustrated in FIG. 3, presence/absence of a relationship, a relationship memo, relationship classification 1, relationship classification 2, a condition node, condition and a relationship have been added. The relationship classification may be, for example, the above-described reliability information. When the condition is a value (content) of a specific material property parameter, a node corresponding to the material property parameter is described in the condition node, and the value or the content is described in the condition. In the item "relationship," a formula is described when the relationship is formulated, and an approximate formula is described when the relationship is empirical. A qualitative relationship may be described in place of the formula or may be mixed with the material property parameter pair for which the formula is defined. For example, whether the material property parameter pair has a positive correlation or a negative correlation may be described. By using all the formulae existing on the path which is the search result, the relationship of the newly found material property parameter pair can be formulated. When the path that is the search result contains a qualitative relationship, it is possible to find a qualitative relationship between the newly found material property parameter pair.

FIG. 13 is an explanatory diagram illustrating a further example of the input form 12 for describing attributes of nodes. For each node corresponding to the material property parameter, items such as the number of edges to be output, the number of edges to be input, the total number of edges to be connected, measurability, the data volume of the database, and material property value are described. The sum of the number of edges to be output, the number of edges to be input, the total number of edges to be connected may be omitted since it can be obtained by generating a graph based on the input form of FIG. 12 and studying the topology of the graph.

In the item "measurability," any of the following is described: "the material property value is measurable in principle and a measuring method therefor exists," "the material property value is measurable in principle but measuring method therefore is unknown" or "the material property value is unmeasurable." In the item of "data volume of database," the data volume of the material property value is described. In the item of "the value of material property," the material property value itself of the material property is described. A value range may be specified instead of exact values.

In the first embodiment, the input forms 11 and 12 and the material property parameter relationship database 1 and the graph 3 have been described separately, but the input forms 11 and 12 themselves may be used as the material property parameter relationship database 1, or the graph 3 may be managed as a graph format database.

In general, a "database" is a collection of data grouped together so users can use. The database can be categorized into several types such a hierarchical database, a networked database and a relational database. The database 1 of the invention may be of any type. It is sufficient that the database 1 of the invention contains at least data constituting the graph 3, that is, a relationship between a material property parameter corresponding to each node and a pair of material property parameters corresponding to each edge as a collection of data, or the database 1 may be composed only of a collection of data constituting the graph 3.

Such a change in the embodiment can be similarly applied to each of the following embodiments.

Second Embodiment

<Integration with User-Side Database>

User data input from the user input illustrated in FIG. 1 may be relationship information among material property parameters found by the user through experiments or the like.

FIG. 14 is a block diagram illustrating a configuration example of a search system 10 according to a second embodiment.

The search system 10 according to the second embodiment includes a database input unit 51 in a user interface 5, and holds user-side material property parameter relationship information 61 input from a user-side database 50 in a user information storage unit 6.

In the second embodiment, the relationship data between the material property parameters held on the system side and the relationship data between the material property parameters defined in the user-side material property parameter relationship information 61 are integrated to generate the graph 3.

Here, the "system-side" refers to a configuration that can be used by a wide range of a plurality of users without any limitation to a specific user, while the "user-side" is a configuration to be used only by a specific user or a user group.

Material property parameter pairs about the relationship data among the material property parameters held on the system side, which are defined in the material property parameter relationship database 1, are referred to as first parameter pairs, and material property parameter pairs defined in the user-side material property parameter relationship information 61 held in the user information storage unit 6 are referred to as second parameter pairs. The graph 3 generated by the graph generator 2 is a graph in which a plurality of material property parameters included in either of the first or the second parameter pairs are nodes, and in between the nodes corresponding to the second parameter pairs in addition to the first parameter pairs are edges.

In this manner, the relationship information among the material property parameters that users uniquely have can be utilized effectively.

An example is a case in which there is no change in the number and the type of nodes in the graph generated from the material property parameter pair for the relationship data between the material property parameters held on the system side, but an edge is added. Since a pair of material property parameters that has not been known on the system side is described in the user-side material property parameter relationship information 61, an edge corresponding to the relationship is added to the graph 3.

Figures 15, 16:
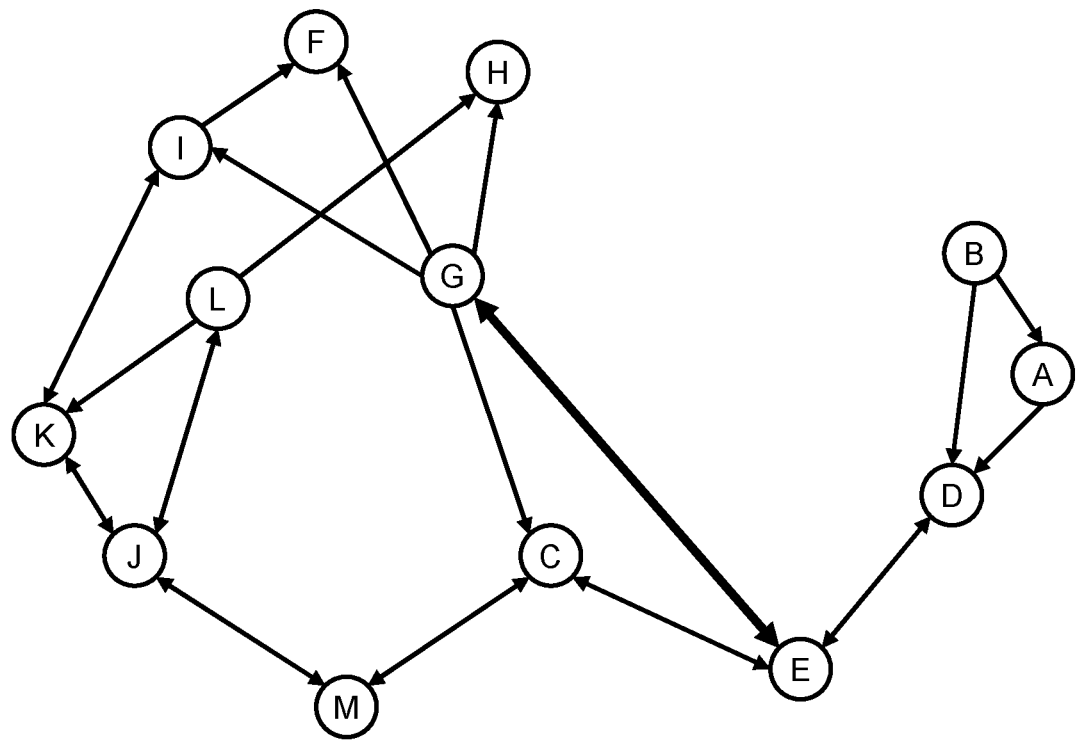
FIG. 15 is an explanatory diagram illustrating an example of a graph (a directed graph) to which an edge has been added by user data.
FIG. 16 is an explanatory diagram illustrating an example of a path search result of the graph to which an edge has been added by user data (FIG. 15).

FIG. 15 is an explanatory diagram illustrating an example of a graph (a directed graph) to which an edge has been added by user data. When the graph illustrated in FIG. 4 is a graph obtained from the system-side material property parameter relationship information on the system side, a bidirectional edge (indicated by a thick bidirectional arrow in FIG. 15) is added between the node E and the node G.

FIG. 16 is an explanatory diagram illustrating an example of a path search result of a graph to which edges have been added by user data (FIG. 15). Compared with the search result (FIG. 6) before the edge is added, the new paths [A-D-E-G-H] and [A-D-E-G-I-K-J-L-H] are extracted as search results.

Further, an example is a case in which a new node is added to a graph generated from material property parameter pairs for relationship data between material property parameters held on the system side. Since a material property parameter pair that has not been known on the system side is described in the user-side material property parameter relationship information 61, an edge corresponding to the relationship is added to the graph 3.

Figures 17, 18:
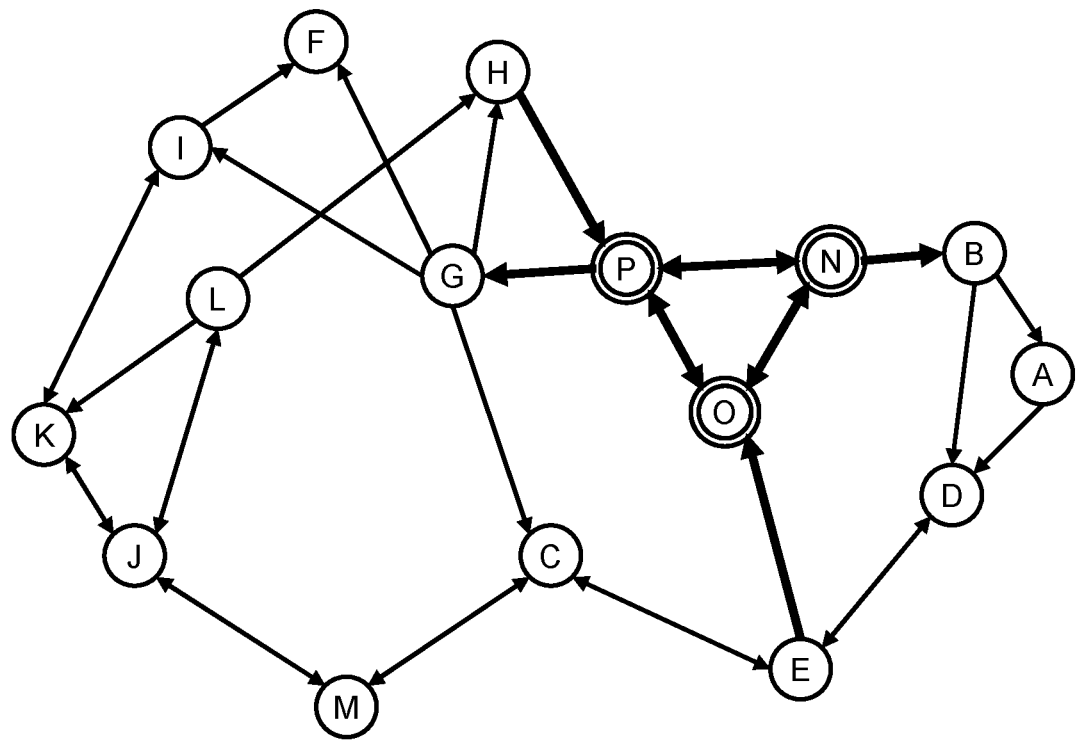
FIG. 17 is an explanatory diagram illustrating an example of a graph (a directed graph) to which a subgraph including new nodes and edges has been added by user data.
FIG. 18 is an explanatory diagram illustrating an example of a path search result of a graph (FIG. 17) to which a subgraph including new nodes and edges has been added by user data.

FIG. 17 is an explanatory diagram illustrating an example of a graph (a directed graph) to which a subgraph including new nodes and new edges has been added by user data. When the graph illustrated in FIG. 4 is a graph obtained from the system-side material property parameter relationship information (system-side graph), the nodes N, O and P (indicated by double line circles in FIG. 17) and their mutual bidirectional edges therebetween and edges between the nodes N, O and P and the nodes B, E, G and H of the system-side graph are added.

FIG. 18 is an explanatory diagram illustrating an example of a path search result of a graph (FIG. 17) to which a subgraph including new nodes and edges has been added by user data. Compared with the search result before the subgraph is added (FIG. 6), the paths[A-D-E-O-P-G-H], [A-D-E-O-P-G-C-M-J-L-H], [A-D-E-O-N-P-G-H] and [A-D-E-O-N-P-G-C-M-J-L-H] are newly extracted as search results.

Similarly, new search results can be extracted when an edge is added to the undirected graph of FIG. 5 and when a subgraph including a node and an edge is added.

The new graph which has been changed by the user data is set to be a search target of the graph searcher 4 only by the user or other users (user group) authorized by the user. Here, the new graph may be generated and temporarily retained only during the period when the user belonging to the user group is logged in or, once created, it may be retained semi-permanently to be managed for each user group. Further, the same user may be able to input various types of user data as user-side material property parameter relationship information.

For example, when the user-side material property parameter relationship information 61 includes second parameter pairs that are not specified in the system-side material property parameter relationship database 1, a rationale for a causal relationship of the second parameter pairs can be found.

A more specific example will be provided.

Figure 19:
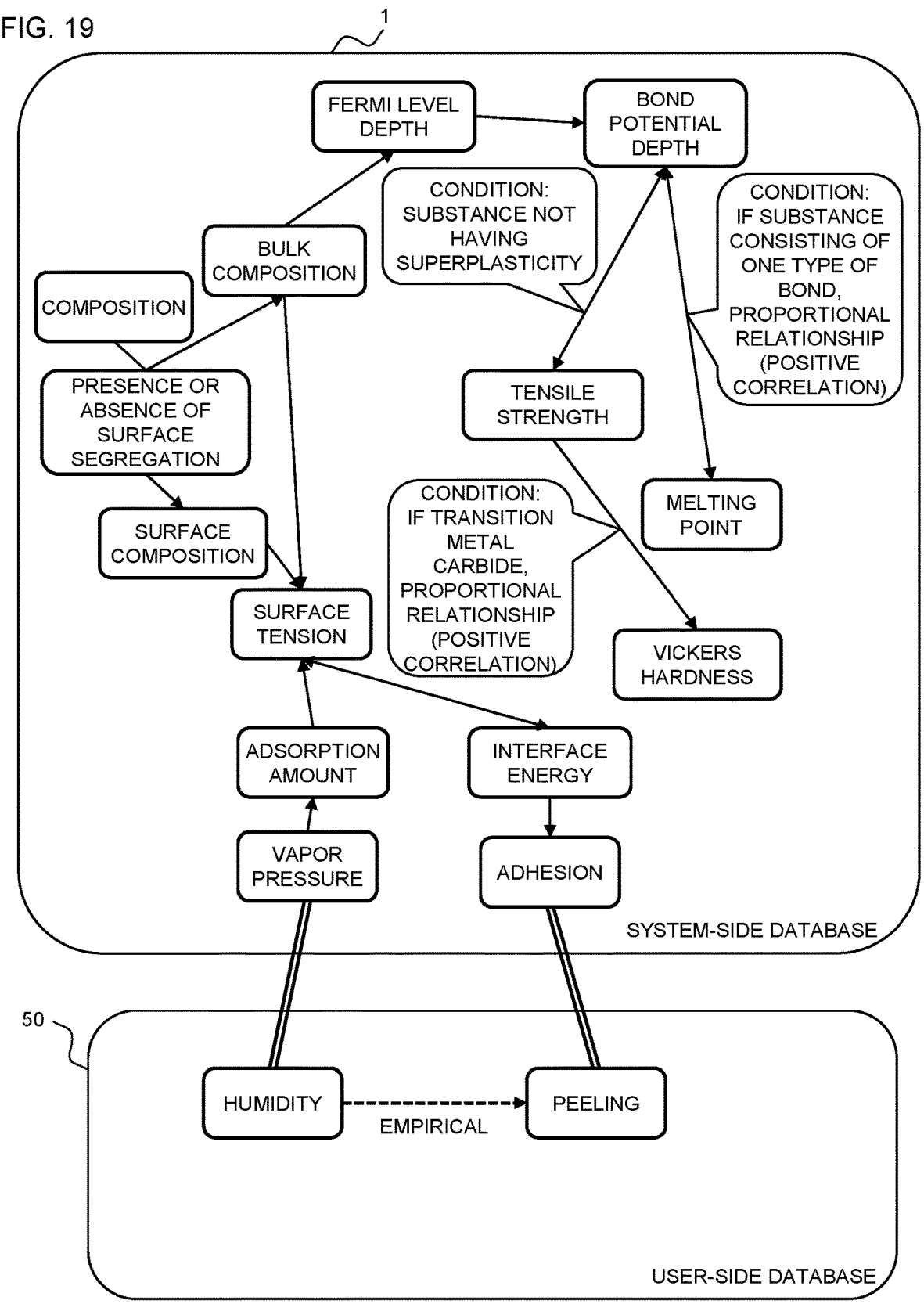
FIG. 19 is an explanatory diagram illustrating an aspect in which a system-side database and a user-side database have been integrated.

FIG. 19 is an explanatory diagram illustrating an aspect in which the user-side database 50 and the system-side database 1 are integrated. The system-side database 1 corresponds to the material property parameter relationship database 1 of FIG. 14, and is represented as the graph 3.

The user has empirically obtained experimental data indicating that products are prone to peeling at high humidities, and this relationship is held in the user-side database 50 with "humidity" and "peeling" as a parameter pair.

The system-side database 1 contains "water vapor pressure" corresponding to "humidity" and "adhesion" corresponding to "peeling" as the nodes of the material property parameters, but there is no edge between the "water vapor pressure" node and the "adhesion" node. This means that, in the material property parameter relationship database 1, a direct relationship between "water vapor pressure" and "adhesion" has not been recognized.

In order to integrate the user-side database 50 and the system-side database 1, correspondence between the material property parameter names is first to be clarified. Here, "humidity" on the user side and "water vapor pressure" on the system side, and "peeling" on the user side and "adhesion" on the system side are to be integrated as material property parameters having the same meaning, respectively. Such association of the material property parameter names may be conducted manually, or may be executed by the search system 10 equipped with a function of matching the material property parameters as described in a third embodiment below.

When the user-side database 50 and the system-side database 1 are integrated in this example, a graph to which an edge has been added between the "water vapor pressure" (synonymous with "humidity") node and the "adhesion" (synonymous with "peeling") node is generated. The added edge is illustrated by a dashed line in FIG. 19. This is because the corresponding relationships are only empirically obtained from the experimental data, so the reliability information "empirical" is used as the edge, as described as an attribute of an edge as described as "an edge with reliability information" in the first embodiment.

When a user searches for a path between the "water vapor pressure" (synonymous with "humidity") node and the "adhesion" (synonymous with "peeling") node, a path starting from "water vapor pressure" and ending at "adhesion" via "adsorption amount," "surface tension" and "interfacial energy" in this order is extracted in addition to a path of which direct causal relationship the user knows empirically. This path represents a causal relationship explained based on the system-side material property parameter relationship database 1. For example, if the system-side material property parameter relationship database 1 is based only on the relationships theoretically explained, the user can find a rationale that supports the knowledge "the product is likely to peel off under high humidity" he/she has empirically obtained. By knowing such a rationale, the user can take measures to improve the adhesion, that is, to prevent peeling, for example, by changing the material to one having larger surface tension. Furthermore, if their relationships are formulated, the improved adhesion can be estimated quantitatively.

In the present embodiment, as an example of integrating the user-side database 50 and the system-side database 1, the example of creating the sum to expand the graph 3 has been mainly described regarding the graph 3. However, to be created is not necessarily the sum, and may be a difference set obtained by applying partial matching or the like.

Third Embodiment

<Integration with User-Side Database; Parameter Name Matching>

FIG. 20 is a block diagram illustrating a configuration example of a search system 10 according to the third embodiment.

In the search system 10 according to the third embodiment, the database input unit 51 described with reference to the second embodiment further includes a material property parameter relationship information extractor 52, a material property parameter matching unit 53 and a thesaurus 54. Other configurations and operations are the same as those of the second embodiment described with reference to FIG. 14, so description thereof will be omitted.

The material property parameters about the relationship data among the material property parameters held on the system side, which are defined in the material property parameter relationship database 1, are referred to as first parameters, and the material property parameters defined in the user-side material property parameter relationship information 61 held in the user information storage unit 6 are referred to as second parameters.

The material property parameter relationship information extractor 52 extracts the names of a plurality of second material property parameters (second material property parameter names) from the user-side database 50. The material property parameter matching unit 53 refers to the thesaurus 54 and collates a plurality of second material property parameter names extracted from the user-side database 50 with a plurality of first material property parameter names (first material property parameter names) stored in the system-side material property parameter relationship database 1. If they are different, the material property parameter matching unit 53 changes the second material property parameter names to the first material property parameter names for the matching of the names of the material property parameters. The material property parameter matching unit 53 may be configured to output the collation result to the user.

Here, the thesaurus 54 can be created by using, for example, ontology. Ontology means a formal expression of knowledge as a set of concepts within a domain and a relationship between those concepts. Ontology provides shared terms used for modeling a certain domain, i.e., the types of objects and concepts present there and their characteristics and relationships. Therefore, regarding material property parameters that become nodes, a shared term is assigned to the same meaning and concept. Another term may be assigned when the same term is used for different meaning in a different field, that is, term confusion is occurring. For example, term confusion may occur with the term "work function." In a technical field in which a "work function" is supposed to be a material property parameter that is defined only with respect to a surface, "a work function of the interface" that is to be defined about an interface is sometimes described as "effective work function." Further, in the field in which there is a habit to call an "effective work function" to be defined simply as a "work function" regarding an interface, a "work function" in original meaning may be described as a "vacuum work function." If there is such term confusion, ontology is effective to handle material property parameters while giving hither priority to intrinsic meaning over literal matching/mismatching. For this reason, ontology may be published for each technical field.

In this manner, the relationship information of the user-side material property parameters specified by using material property parameter names different from that on the system side may be matched with the system-side material property parameter relationship database 1 by using published or provided ontology.

In this manner, appearance inconsistency such as a difference in expression between the relationship information that users uniquely have among the material property parameters and the relationship information that the search system side has as user-independent common information can be removed, and information users have can be used more effectively.

Fourth Embodiment

<Integration with User-Side Database; Collation of Relationship Information>

FIG. 21 is a block diagram illustrating a configuration example of a search system 10 according to the fourth embodiment. The user interface 5 of the search system 10 described in the third embodiment (FIG. 20) further includes a relationship information collator 55. Other configurations and operations are the same as those of the third embodiment described with reference to FIG. 20, so description thereof will be omitted.

Here, as in the case of the second embodiment, material property parameter pairs about the relationship data among the material property parameters held on the system side, which are defined in the material property parameter relationship database 1, are referred to as first parameter pairs, and material property parameter pairs defined in the user-side material property parameter relationship information 61 held in the user information storage unit 6 are referred to as second parameter pairs.

The relationship information collator 55 collates relationship information between a first parameter pair defined in the system-side material property parameter relationship database 1 and a second parameter pair defined in the user-side database 50 regarding the same pair of the material property parameter as that of the first parameter pair, and outputs a collation result.

In this manner, the user can verify correctness, completeness, etc. of the relationship information among the material property parameters he/she uniquely has.

The collation result is expected to be exactly the same if the relationship is related to the same pairs of material property parameters. However, it is highly possible that the material property parameter relationships on the system side are defined under exhaustive conditions while the relationships defined in the user-side database 50 are defined under conditions within the range required by the user. For example, a material property parameter pair may have a positive correlation coefficient (a direct proportional relationship) under a certain condition and a negative correlation coefficient (an inverse proportional relationship) under another condition. The relationship between the material property parameters on the system side is defined with the first parameter pair being associated with a conditional edge in order to exhaustively define the relationship. On the other hand, the second parameter pair is associated with an unconditional edge because the user is only interested in the characteristics under one of the conditions, or only the experimental data under that condition has been collected, and so on. In this manner, edges with or without conditions may be associated with the same material property parameter pair.

The relationship information collator 55 in the fourth embodiment outputs, as a collation result, a difference regarding presence or absence of conditions about relationship information between the first parameter pair defined in the system-side material property parameter relationship database 1 and the second parameter pair defined in the user-side database 50. In the above example, the relationship information collator 55 can detect that presence or absence of a condition differs between the system-side database and the user-side database regarding the above-described material property parameter pair and output a detection result.

In this manner, the user can notice that the second parameter pair exhibits a relationship different from that specified in the user-side database 50 under certain conditions. Even if the user already has such knowledge, the present invention is useful in that the user can confirm that such knowledge is correct.

A more specific example will be provided.

FIG. 22 is an explanatory diagram illustrating an aspect in which a user-side database 50 is being collated with a system-side database 1. The system-side database 1 corresponds to the material property parameter relationship database 1 of FIG. 14, and is represented as the graph 3.

The user empirically has experimental data (chart in the figure) illustrating that the Vickers hardness of transition metal carbides has a negative correlation with the melting point. The relationship is held in the user-side database 50 as a relationship with the "melting point" and the "Vickers hardness" as a parameter pair.

In this example, the relationship information collator 55 collates the relationship information about the pair of the "melting point" and the "Vickers hardness," and outputs a path between the node "melting point" to the node "Vickers hardness" stored in the system-side database 1 as a collation result. The output path is, for example, as follows.

(1) A path is from "melting point" to "Vickers hardness" via "bonding potential depth" and "tensile strength."

(2) A path in which an edge from "melting point" to "depth of bond potential" is conditional on "a substance consisting of one type of bond has proportional relationship (positive correlation)."

(3) A path in which an edge from "depth of bond potential" to "tensile strength" is conditional on "if substance does not show superplasticity."

(4) A path in which an edge from "tensile strength" to "Vickers hardness" is conditional on "transition metal carbide has proportional relationship (positive correlation)."

Since the experimental data he/she has is about the transition metal carbide, the user can know that the above conditions (3) and (4) are satisfied, but the condition (2) is not satisfied from this collation result. That is, since "transition metal carbide" is not "a substance consisting of one kind of bond," it is noticed that the relationship from "melting point" to "depth of bond potential" does not always have a positive correlation.

Figure 23:
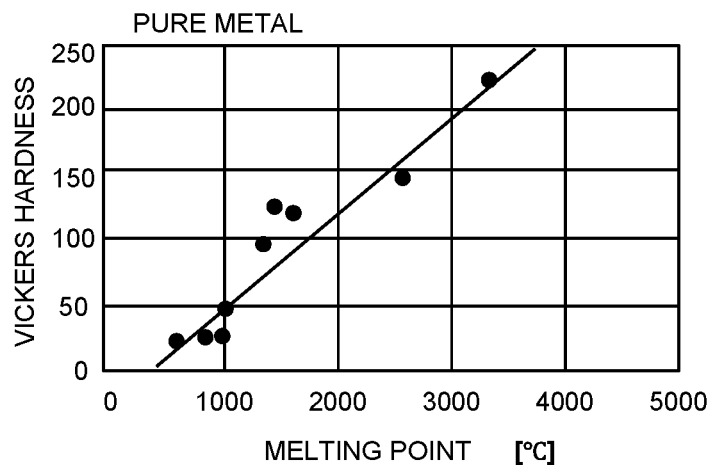
FIG. 23 is experimental data (chart) showing there is a positive correlation between the Vickers hardness and a melting point of pure metal.
Figure 24:
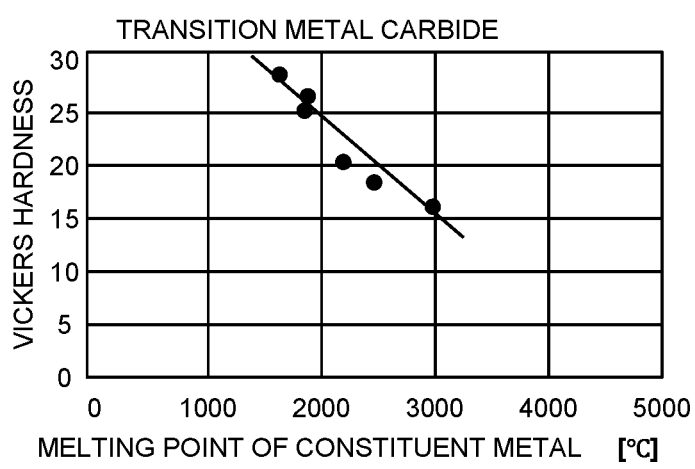
FIG. 24 is experimental data (chart) showing there is a negative correlation between the Vickers hardness of transition metal carbide and a melting point of metal composing the same.

Further, although not illustrated in FIG. 22, if the system-side database 1 contains data representing the relationship as illustrated in FIGS. 23 and 24, an environment that enables the user to more deeply examine the data can be provided. FIG. 23 is experimental data (chart) illustrating that the Vickers hardness of pure metal has a positive correlation with its melting point. FIG. 24 is experimental data (chart) illustrating that the Vickers hardness of transition metal carbide has a negative correlation with a melting point of metal composing the same.

In a material composed of one type of bond such as pure metal, the depth and the melting point of binding energy have a positive correlation, the binding energy and the Vickers hardness have a positive correlation, and the melting point and the Vickers hardness have a positive correlation as illustrated in FIG. 23. In the transition metal carbides, the melting point and the Vickers hardness have a negative correlation therebetween as shown in the experimental data held by the user (FIG. 22). This is considered to be because the bond potential depth and the Vickers hardness are in a positive relationship while the melting point and the bond potential are not in a positive relationship in the transition metal carbide. Further, it is known that the melting point of the transition metal carbide is determined almost by the melting point of the constituent transition metal and, since the Vickers hardness has a negative correlation with the melting point of the constituent transition metal as illustrated in FIG. 24, the reason why there is a negative correlation between the melting point and the Vickers hardness in the transition metal carbide is explained as follows.

This is because there are two types of bonds in transition metal carbide: a transition metal-carbon bond and a bond between transition metals, and the melting point is determined by the potential depth of a bond between transition metals, while the Vickers hardness is determined by the potential depth of a transition metal-carbon bond. In this system, since the potential depth of the bond of the entire system is determined by the potential depth of the transition metal-carbon bond, the "positive relationship between the melting point and the bond potential" that are established in pure metals is not adopted.

In this manner, by collating the user-side database with the system-side database 1 (the material property parameter relationship database 1 in FIG. 14), the user can be provided with a new finding, from which he/she can obtain new knowledge. If the user can find the relationship in FIG. 24 as a new knowledge in the above example, it is possible to identify the transition metal carbide having a desired Vickers hardness by appropriately selecting the type of the constituent transition metal. This has extremely high industrial benefit in that the optimum material can be selected without experimentation.

The collation between the system-side database and the user-side database described in the third and fourth embodiments is not executed under the precondition of subsequent integration of these databases. That is, only collation of the databases may be executed, but the graphs do not necessarily have to be integrated, or a path search in the graphs does not necessarily have to be executed. Further, it may be configured to be capable of outputting a difference set of graphs or a subgraph as a collation result.

<Search Method for Integration/Collation with User-Side Database>

As described above, the search system 10 of the present invention described in the second to fourth embodiments can be constructed to function as software on a hardware system including a storage device and a computer as described with reference to FIG. 2 in the "hardware/software implementation" of the first embodiment. Therefore, the invention can be regarded as a search method using a hardware system equipped with a storage device and a computer.

FIG. 25 is a flowchart illustrating a configuration example of the search method according to the second to fourth embodiments.

The search method according to the second to fourth embodiments includes a graph generation step (S2) in which a graph (reference numeral 3 in FIG. 1) is generated from the material property parameter relationship database (reference numeral 1 in FIG. 1) input in the input step (S1), and a graph search step (S3), and is configured as follows.

The material property parameter relationship database (1) stores a plurality of parameter pairs of material property parameters having mutual relationships as described in the first to fourth embodiments. These parameter pairs are referred to as first parameter pairs. In the graph generation step (S2), a graph (3) in which a plurality of material property parameters included in this first parameter pair are nodes and in between the nodes corresponding to the parameters is an edge is generated. In the graph search step (S3), the graph (3) is searched based on a search condition (including a query) provided in the search condition input step (S4).

The search method according to the second to fourth embodiments further includes a user-side database input step (S5).

In the user-side database input step (S5), second parameter pairs is extracted from the input user-side database and stored in the user information storage unit (S8) for each user identified based on the user identification information. Here, the second parameter pair is a pair of material property parameters stored in the user-side database and having a relationship with each other. The user is not limited to a single person, and may be a user group consisting of a plurality of people.

In this manner, knowledge of relationship information among material property parameters the users tangibly and intangibly have can be utilized effectively.

In the above search method, in the graph generation step (S2), the second parameter pairs extracted from the user-side database are integrated in addition to the plurality of first parameter pairs stored in the material property parameter relationship database to generate the graph (3). That is, the generated graph (3) is a graph in which a plurality of material property parameters included in either of the first or the second parameter pairs are nodes, and in between the nodes corresponding to the second parameter pairs in addition to the first parameter pairs are edges.

In this manner, the relationship information among the material property parameters that users uniquely have can be utilized effectively.

The above-described search method may further include a material property parameter relationship information extraction step (S6) and a material property parameter matching step (S7).

In the material property parameter relationship information extraction step (S6), a plurality of second material property parameter names are extracted from the user-side database. In the material property parameter matching step (S7), the material property parameter names are matched with reference to the thesaurus. For example, in the material property parameter matching step (S7), the second material property parameter names are collated with the first material property parameter names, and if they are different, the second material property parameter name is changed to the first material property parameter name.

In this manner, appearance inconsistency such as a difference in expression between the relationship information that users uniquely have among the material property parameters and the relationship information that the search system side has as user-independent common information can be removed, and information users have can be used more effectively.

It is more preferable that the above search method further includes a relationship information collation step (S9).

In the relationship information collating step (S9), pieces of relationship information about the same pair of material property parameters are collated between the first parameter pairs and the second parameter pairs, and collation results are output (S11).

In this manner, users can verify correctness, completeness, etc. of the relationship information among the material property parameters they uniquely have.

Fifth Embodiment

<Maintenance and Management of Search History>

User data input from the user input illustrated in FIG. 1 may be relationship information among material property parameters found by the user through experiments or the like.

FIG. 26 is a block diagram illustrating a configuration example of a search system 10 according to the fifth embodiment.

The search system 10 according to the fifth embodiment includes a search interface 56 and a search history manager 57 in the user interface 5. In order to execute a series of searches in the graph searcher 4, the search conditions input through the search interface 56 are held in the user information storage unit 6 as the search history 62 via the search history manager 57. The search history 62 may include not only the search conditions but search results corresponding thereto.

The user can refer to the search history 62, held in the user information storage unit 6, via the user interface 5.

In this manner, the user can manage his/her own search history. For example, the user can refer to the searches conducted in the past and have the referred searches be reflected in the future search policy. The user can refer not only to the history of searches conducted by himself/herself but to the history of searches conducted by other users in the past. For example, the search history manager 57 may be provided with a means for managing each user, as to whether other users are authorized or which user is authorized to refer to the user's own search history.

Sixth Embodiment

<Analysis of Search History>

In the search system 10 of the fifth embodiment illustrated in FIG. 26, the user interface 5 may further include a search history analyzer 58. Other configurations and operations are the same as those of the fifth embodiment described with reference to FIG. 26, so description thereof will be omitted.

The search history analyzer 58 analyzes the search history 62 held in the user information storage unit 6 and presents reference information to users as analysis results. For example, when a user tries to conduct a search that had already been executed in the past, the search history analyzer 58 warns the user about the fact that the search had been executed.

In this manner, the user can obtain knowledge from his/her own search history and use the knowledge in his/her future searches.

The search history analyzer 58 can further be provided with a machine learning function. For example, the search history analyzer 58 can infer the user's search target by conducting machine learning in the search history, and provide the user with a search condition such as a recommended query and a search range as reference information.

Here, the search history to be searched is limited to the search history by the user when inferring the search target of the user, but in order to learn the universal search tendency, search histories of other users may be targeted. Although it is not a technical issue, in practice it is necessary to obtain consent from each user to use the user's search history for the purpose of learning a universal search tendency.

By referring to search histories of other users in other technical fields, it is possible to obtain search conditions such as a recommended query and a recommended search range by inference with higher accuracy. This is because the mathematical formulas that define the relationships between material property parameters may be in exactly the same or very similar form when defining relationships between completely different material property parameters in completely different technical fields. Since the relationships defined by mathematical formulas of exactly the same format have the same topology in graphs, search software using algorithms based on graph theory can be used.

More specific embodiments will be described.

<Use of User's Own Search History>

When a user conducts a search, the search system 10 refers to the search history of that user and outputs reference information that can provide notice to the user. Here, the user may be an individual or, for example, a user group engaged in the same research theme. The reference information may be in any output form, such as display of search results, path information, or subgraph data.

(1) When the search for a path starting from node A and ending at node B and having the path length equal to or shorter than a predetermined length n (the query 4 "search paths from A to B within n paths" in FIG. 8) is executed, the search system 10 refers to the search history in which the same start point and the same end point were specified, and outputs a difference between the search results and the result of the current search as reference information.

The queries of the search history suitable for reference are, for example, query 1 "search paths from A to B"), query 2 "search paths from A to B including D in the paths"), query 3 "search paths from A to B excluding D in the paths"), query 4 "search paths from A to B within n paths"), etc. as illustrated in FIG. 8.

By making focus on the paths that have not been extracted in the past but are extracted in this search with priority, it is possible to provide the user new notice.

(2) When the search for a path starting from node A and ending at node B (the queries 1 to 4 in FIG. 8, "search paths from A to B [ . . . ]") is executed, the search system 10 refers to the search history for which the same start point (A) and a different end point (X) or a different start point (Y) and the same end point (B) are specified. A common path of these search results and the current results, an uncommon path, or a sum graph of a path of the search result is output as reference information.

By showing the user commonality and differences between the paths for which different start points or different end points are specified and have been searched for in the past, it is possible to provide an opportunity to confirm or review the search policy.

(3) When the search for a path starting from node A and ending at node B (the queries 1 to 4 in FIG. 8, "search paths from A to B [ ... ]") is executed, the search system 10 refers to the history of the search for which the end point (B) is specified as the start point (for example, the queries 1 to 4 "search paths from B to Z [ ... ]" illustrated in FIG. 8) and/or the path around the end point (B) (for example, the query 5 "search paths around B within m paths" illustrated in FIG. 8. A common path of these search results and the current results, an uncommon path, or a sum graph of a path of the search result is output as reference information.

In this manner, a new start point candidate or an end point candidate that the user has not noticed can be presented to the user, which encourages the user to have new notice.

(4) When search of a path of a length of m1 nodes or shorter around node M (for example, the query 5 "search paths around M within m1 paths" illustrated in FIG. 8) is executed, the search system 10 refers to the search history of the path of which length is shorter than or equal to mi nodes (different from m1) around the same node M, and outputs the search result of the history and/or the difference obtained by subtracting the path which is the search result of the history from the path which is the current search result as reference information.

By making focus on the paths that have not been extracted in the past but are extracted in this search with priority, it is possible to provide the user new notice.

(5) When the search for a path starting from node A and ending at node B (the queries 1 to 4 in FIG. 8, "search paths from A to B [ ... ]") is executed, the search system 10 outputs the search history that shares many of the search results and paths as additional information. It is possible to discover a start point node A' and an end point node B' having different start and target material properties from those of the start point A and the end point B while passing through similar material properties. This can encourage the user to think of replacing A with A', replacing B with B', and so on.

(6) When search of a path of a length of m1 node or shorter around node M (for example, the query 5 "search paths around M within m1 paths" illustrated in FIG. 8) is executed, the search system 10 outputs a subgraph of the search result and a search history having a subgraph of a similar shape as a graph as reference information.

In this manner, a function to present a group of material property parameters having a certain relationship with the material properties searched by the user in the past to the user as an alternative can be provided.

For example, the same mathematical formula may theoretically explain the relationship between completely different material properties in a completely different field. Regarding a relationship that are not yet theoretically explained in the field the user is searching, if the user find that the relationship is similar to a relationship between other material properties in other fields, he/she can hypothesize that the relationship can be explained with the same mathematical formula. It is expected that users will be encouraged to notice something by being presented a group of material properties having similar relationships, if there is no extreme hypothesis of "explaining with the same mathematical formula."

<Use of Search History of Other Users>

When a user conducts a search, the search system 10 refers to the search history of not only that user but those of other users and outputs reference information that can provide the user notice.

(1) When the search for a path starting from node A and ending at node B and having the path length equal to or shorter than a predetermined length n (the query 4 "search paths from A to B within n paths" in FIG. 8) is executed, the search system 10 refers to the search history of other users who specified the same start point and the same end point, and outputs the path most selected or the least selected by other users as reference information.

(2) When the search for a path starting from node A and ending at node B (the queries 1 to 4 in FIG. 8, "search paths from A to B [ ... ]") is executed, the search system 10 refers to the search history of other users who specified the same start point A and different end points (X) and/or specified different start points (Y) and the same end point (B). Then, the search system 10 outputs the different end points (X1) most selected by other users, the most selected different start points (Y1), the least selected different end points (X2) and the least selected different start points (Y2) as reference information. Further, the path that is the search result from the start point A to the end point B executed by the user himself/herself, a common path and an uncommon path with the search history of other users, a sum graph consisting of two paths, and so on may be output as reference information. Here, as the paths by the search history of other users are, for example, the path from the start point A to the end point (X1) most selected by other users, the path from the start point A to the end point (X2), which is the least selected by other users, the path from the start point (Y1) to the end point (B), which is the most selected by other users, the path from the start point (Y2) to the end point (B), which is the least selected by other users, and so on.

(3) When the search for a path starting from node A and ending at node B (the queries 1 to 4 in FIG. 8, "search paths from A to B [ ... ]") is executed, the search system 10 refers to the history of the search of other users for which the end point (B) is specified as the start point (for example, the queries 1 to 4 "search paths from B to Z [ ... ]" illustrated in FIG. 8) and/or the path around the end point (B) (for example, the query 5 "search paths around B within m paths" illustrated in FIG. 8, and outputs the search range of other users as reference information. In addition, the end point (Z1) most searched by other users, the end point (Z2) having the least number of search histories, a node (Z3) that has not been searched for as an end point while being within the search range this time and in the past, and so on may further be output as reference information.

(4) When search of a path of a length of m1 nodes or shorter around node M (for example, the query 5 "search paths around M within m1 paths" illustrated in FIG. 8) is executed, the search system 10 refers to the search history by other users of the path of which length is shorter than or equal to mi nodes (different from m1) around the same node M, and can output a list of the most searched search formulas, the least frequently searched search formulas, or the like, and the difference from the current search result as reference information.

(5) When the search for a path starting from node A and ending at node B (the queries 1 to 4 in FIG. 8, "search paths from A to B [ ... ]") is executed, the search system 10 outputs the search history by other users that shares many of the search results and paths as additional information. It is possible to discover a start point node A' and an end point node B' having different start and target material properties from those of the start point A and the end point B while passing through similar material properties. This can encourage the user to think of replacing A with A', replacing B with B', and so on.

(6) When search of a path of a length of m1 node or shorter around node M (for example, the query 5 "search paths around M within m1 paths" illustrated in FIG. 8) is executed, the search system 10 outputs search histories by other users having a subgraph of the search result and a subgraph of a similar shape as a graph as reference information.

In this manner, a function to present a group of material property parameters having a certain relationship with the material properties searched by other users in the past to the user as an alternative can be provided.

<Search Method for Using User's Search History by Retaining, Managing and Analyzing>

As described above, the search system 10 of the present invention described in the fifth and sixth embodiments can be constructed to function as software on a hardware system including a storage device and a computer as described with reference to FIG. 2 in the "hardware/software implementation" of the first embodiment. Therefore, the invention can be regarded as a search method using a hardware system equipped with a storage device and a computer.

FIG. 27 is a flowchart illustrating a configuration example of the search method according to the fifth and sixth embodiments.

The search method according to the fifth and sixth embodiments includes a graph generation step (S2) in which a graph (reference numeral 3 in FIG. 1) is generated from the material property parameter relationship database (reference numeral 1 in FIG. 1) input in the material property parameter relationship database input step (S1), and a graph search step (S3), and is configured as follows.

The material property parameter relationship database (1) stores a plurality of parameter pairs of material property parameters having mutual relationships as described in the fifth and sixth embodiments. In the graph generation step (S2), a graph (3) in which a plurality of material property parameters included in this parameter pair are nodes and in between the nodes corresponding to the parameters is an edge is generated. In the graph search step (S3), the graph (3) is searched based on a search condition (including a query) provided in the search condition input step (S4).

The search method according to the fifth and sixth embodiments further includes a search history management step (S12).

In the search history management step (S12), the search conditions provided via the search condition input step (S4) is stored as the search history in the search history holder (S13) for each user identified based on the user identification information. As the search history, the search results corresponding to the search conditions can also be stored in the search history holder (S13). The user can refer to the stored search history to obtain the search history reference result (S14). The search history is not limited to the user's own search history, and the user can refer to the search histories of other users who gave him/her a permission to do so.

In this manner, the user can refer to the search history of himself/herself or other users who authorized him/her to refer to the search history, and can provide appropriate feedback to his/her own search policy to improve search efficiency.

It is more desirable that the above search method further includes a search history analysis step (S15).

In the search history analysis step (S15), the search history held in the search history holder (S13) is analyzed and an analysis result (S16) is presented to the user. Specific examples of analysis are as described above in "Use of user's own search history" and "Use of search history of other users."

In this manner, the user can obtain knowledge from his/her own search history and use the knowledge in his/her future searches.

Seventh Embodiment

<Material Property Parameter Relationship Information Extractor>

The search system 10 of the first embodiment illustrated in FIG. 1 may further include a material property parameter relationship information extractor 71. The material property parameter relationship information extractor 71 extracts information on a material property parameter pair and a relationship therebetween by deep learning targeting a natural language such as textbook documents and articles input as learning data 70, and supplies the extracted information to the material property parameter relationship database 1.

FIG. 28 is a block diagram illustrating a configuration example of a search system 10 according to the seventh embodiment.

The search system 10 further includes a material property parameter relationship information extractor 71 that extracts material property parameter pairs and their relationship information from the learning data 70 and supplies them to the material property parameter relationship database 1. Other configurations and operations are the same as those of the first to sixth embodiments described with reference to FIGS. 1, 10, 11, 14, 20, 21, and 26, so description thereof will be omitted.

FIG. 29 is a block diagram illustrating a configuration example of the material property parameter relationship information extractor 71.

The material property parameter relationship information extractor 71 may include a learning model generator 72 and a relationship extractor 75, and may further include a cleaner 80 to which a corpus 79 is input.

The learning model generator 72 includes a material property name model generator 73 that extracts material property names from the input learning data 70, and a relationship expression model generator 74 that extracts relationship expressions. The material property name model generator 73 generates a material property name model as a learning model and supplies the generated model to the relationship extractor 75. The relationship expression model generator 74 generates a relationship expression model as a learning model and supplies the generated model to the relationship extractor 75.

The relationship extractor 75 includes a positional relationship determiner 78, and extracts a triple composed of a relationship expression indicating two material property names and the relationship therebetween. Here, "triple" is an expression that means "A and B are in a relationship C," for example. The relationship extractor 75 generates a material property name list 76 and a relationship expression list 77 based on the material property name model and the relationship expression model supplied from the learning model generator 72, and supplies the generated lists to the positional relationship determiner 78. The positional relationship determiner 78 extracts a triple from the positional relationship of the material property name and words of the relationship expression included in the material property name list 76 and the relationship expression list 77 in the sentence included in the input learning data 70, and outputs the extracted triple. A known algorithm such as co-occurrence or Word2Vec can be adopted for natural language processing to determine the positional relationship. "Co-occurrence" is an algorithm for estimating that two or more words are closely related to each other when they appear close to each other in a sentence, and can be applied to a process for extracting a pair of material property parameters having mutual relationship. Since it is highly possible that words describing the relationship exist in the vicinity of the two words that are extracted as having a relationship, the words that represent the relationship should be further extracted to form a "triple." "Word2Vec" is an algorithm in natural language processing that the concept of a plurality of words is vectorized in a multidimensional space and associates the angles formed by the vectors with the density (high or low) of the relationship between the two words. This algorithm is often used in natural language processing. It can be used in the process of extracting pairs of words that have a close relationship.

Since the output data from which a triple is extracted may include the relationship between events other than the material property name, the cleaner 80 using the corpus 79 removes inappropriate data and supplies the data to the material property parameter relationship database 1. Here, the corpus is a database in which ancillary attributes such as part of speech and syntax are structured in material property parameters based on a technical terminology dictionary and the like.

With the corpus, the management burden of updating the material property parameter relationship database 1 can be reduced.

In the present embodiment, the configuration example in which the corpus 79 is held in the search system 10 is described, but it may be supplied from the outside.

The output of the cleaner 80 may include the relationship of the material property parameter pair already included in the material property parameter relationship database 1 in duplicate. The search system 10 may further include a verifier that collates the relationship of the material property parameter pair already included in the material property parameter relationship database 1 with the relationship of the material property parameter pair extracted by the material property parameter relationship information extractor 71, to confirm there is no inconsistency. In this manner, reliability of the material property parameter relationship database 1 can be secured.

The learning data 70 to be input needs to include document data that defines the material property name and its relationship, for example, a document such as a textbook. Textbooks generally contain only the facts that have been directly and indirectly scrutinized by many experts and confirmed to be academically true, so possibility that false relationships between material property parameters are found in material property parameter relationship databases 1 is reduced. Further, the learning data 70 may include mathematical expressions in addition to documents in natural language, that is, text data. The formula should be expressed in a well-known format such as Math ML. On the other hand, in documents such as textbooks, mathematical formulas are often image data even if they are provided in pdf with text data. By analyzing the arrangement of variable parameters, functions, operators, equals ("="), etc. from the image data, the relationship between the variable parameters can be understood. The variable parameter is represented by a sign and a symbol, by referring to the correspondence between the material property name and the sign and the symbol in the learning data. Therefore, even if the mathematical formula in the learning data is image data, the material property name model and the relationship model can be extracted as learning models from the mathematical formula.

The learning data 70 to be input may include data listing the exact material property names in addition to the document data defining the material property names and their relationships. For example, headings in a terminology dictionary, indices in a data handbook, and tags in Wikipedia. By setting such learning data to be input to the material property name model generator 73, accuracy and completeness of the generated material property name list 76 are improved, and the quality of the learning model is improved. Further, instead of automating all of the learning model generation, the learning model created manually may be input to the material property parameter relationship information extractor 71. Hereinafter, some modifications will be described.

<First Modification>

In addition to the learning data of natural language such as a textbook document or an article, the material property names and the relationship expressions manually extracted from the textbook document may be input to the learning model generator 72 as further learning data. By performing named entity recognition, the learning model generator 72 can learn a pattern in which the manually extracted material property names and the relationship expressions appear in the natural language in the learning data, further extract other material property names and relationship expressions, and generate a learning model of the material property name model and the relationship model.

<Second Modification>

The material property name model generator 73 may be omitted from the learning model generator 72, and the material property names manually extracted from a material property name dictionary, a textbook document, etc. may be directly input as the material property name list 76 of the relationship extractor 75 instead. Although it is not possible to further extract material property names other than those extracted and from dictionaries, etc. and input, there is no risk of erroneously extracting words other than material property names, whereby reducing or eliminating processing load of the corpus 79 and the cleaner 80.

<Third Modification>

The entire learning model generator 72 may be omitted and, instead, the material property names and their relationships manually extracted from textbook documents and the like can be directly input to the positional relationship determiner 78 as learning data. Further, a textbook document, an article, or other documents describing material properties can be vectorized and directly input to the positional relationship determiner 78 as word vectors.

In the learning data obtained by manually extracting material property names and their relationships, by categorizing the relationships into "proportional," "inverse proportional," "exponential," "logarithmic," "square proportional," "monotonically increasing (qualitative relationship)," "monotonically decreasing (qualitative relationship)," and so on to some extent, burden of manually extracting learning data in advance can be reduced, and processing load of the relationship extractor 75 can be reduced. On the other hand, even if an expression different from those clearly defined as the above-described type is used in the textbook document to be processed by the relationship extractor 75, the relationship cannot be extracted as relationship information unless further processing such as named entity recognition is added. By inputting a word vector based on a textbook document or the like to the positional relationship determiner 78, it is possible to complementarily extract relationships with expressions different from the above types.

Also in this modification, the risk of erroneously extracting words other than the material property name is reduced, whereby reducing or eliminating processing load on the corpus 79 and the cleaner 80.

<Search Method Including Material Property Parameter Relationship Information Extraction Process>

As described with reference to FIG. 2 in the "hardware/software embodiment" of the first embodiment, the search system 10 of the invention described in the seventh embodiment can be constructed to function as software on a hardware system including a storage device and a computer. Therefore, the present invention can be regarded as a search method using a hardware system equipped with a storage device and a computer.

FIG. 30 is a flowchart illustrating a configuration example of the search method according to the seventh embodiment.

The search method according to the seventh embodiment includes a graph generation step (S2) in which a graph (reference numeral 3 in FIG. 1) is generated from the material property parameter relationship database (reference numeral 1 in FIG. 1) input in the material property parameter relationship database input step (S1), and a graph search step (S3), and is configured as follows.

The material property parameter relationship database (1) stores a plurality of parameter pairs of material property parameters having mutual relationships as described in the first to sixth embodiments. In the graph generation step (S2), a graph (3) in which a plurality of material property parameters included in this parameter pair are nodes and in between the nodes corresponding to the parameters is an edge is generated. In the graph search step (S3), the graph (3) is searched based on a search condition (including a query) provided in the search condition input step (S4).

The search method according to the seventh embodiment further includes a learning model generation step (S21) and a relationship extraction step (S24).

The learning model generator (S21) generates a material property name model and a relationship expression model as learning models (S22, S23) from supplied learning data (S20) and supplies the generated models to the relationship extraction step (S24).

In the relationship extraction step (S24), document data in natural language is input from the learning data (S20). In the relationship extraction step (S24), a triple is extracted by using a material property name list created from the material property name model and a relationship expression list created from the relationship expression model, and based on the positional relationship among the material property names and the relationship expression in the input document data. The triple includes two material property names corresponding to a material property parameter pair having a causal relationship and a relationship expression representing the relationship therebetween. The triple is then output as output data.

In this search method, the contents of the material property parameter relationship database (1) are updated with the output data.

In this manner, management burden of updating the material property parameter relationship database (1) can be reduced.

It is more preferable that the above search method further includes a cleaning step (S25) in which a corpus is input.

In the cleaning step (S25), triples that are determined not to indicate the relationship between the material property parameter pairs are removed based on the corpus from the triples extracted in the relationship extraction step (S24) to obtain the output data.

In this manner, management burden on the data reliability when updating the material property parameter relationship database (1) can be reduced.

While the invention made by the inventor has been particularly described with respect to the embodiments thereof, the invention is not limited thereto and other changes may be made therein without departing from the spirit and scope of the invention.

INDUSTRIAL APPLICABILITY

The present invention relates to a search system and a search method using a database, and more particularly, the invention is capable of being suitably used for searching for a relationship among a plurality of material property parameters.

EXPLANATION OF SIGN

1 Material property parameter relationship database
2 Graph generator
3 Graph
4 Graph searcher
5 User interface
6 User information storage unit
7 Condition extractor
8 Path evaluator
9 Priority determiner
10 Search system
11 Input form of material property parameter relationship database
12 Input form for describing attributes of nodes
50 User-side database
51 Database input unit
52 Material property parameter relationship information extractor
53 Material property parameter matching unit
54 Thesaurus
55 Relationship information collator
56 Search interface
57 Search history manager
58 Search history analyzer
61 User-side material property parameter relationship information
62 Search history
70 Learning data
71 Material property parameter relationship information extractor
72 Learning model generator
73 Material property name model generator
74 Relationship expression model generator
75 Relationship extractor
76 Material property name list
77 Relationship expression list
78 Positional relationship determiner
79 Corpus
80 Cleaner
100 Server
110, 120 Workstation
101, 111, 121 Calculator 102, 112, 122 Storage Device
103, 113, 123 Network interface
104, 114, 124 Input unit
105, 115, 125 Display unit
200 Network

The invention claimed is:

1. A search system implemented in a computer comprising: a memory and a processor configured to execute a sequence of programmed instructions stored in the memory to perform a search by the search system, the search system comprising a first database stored in the memory, a graph generator, a graph searcher, a user interface and a user information storage unit, wherein:

the first database stores a plurality of first parameter pairs of material property parameters having mutual relationships, the material property parameters indicating properties of materials;

the graph generator generates a graph in which material property parameters included in each of the first parameter pairs are nodes and in between the nodes corresponding to each first parameter pair is an edge;

the graph searcher searches the graph based on a search condition provided via the user interface and outputs a search result;

the user interface being configured to receive input data from a plurality of users and make the user information storage unit hold the input data from the users separately for each user that has been granted access by the computer based on user identification information;

the user interface further includes a database input unit to which a second database is input as the input data for a user, the second database containing user specific material property parameter relationship information which is information that the user has about relationships among material property parameters and is information that is different from the relationship information contained in the first database the database input unit being configured to extract, separately for each user, as second parameter pairs, one or more pairs of material property parameters having mutual relationships from the second database, and make the user information storage unit hold separately for each user the one or more second parameter pairs and their relationship information;

wherein the graph generator is further configured to generate an integrated graph in which the one or more second parameter pairs stored in the user information storage unit for a user are integrated with the first parameter pairs, and in which the material property parameters included in either of the first or the second parameter pairs are nodes, and in between the nodes corresponding to the second parameter pairs in addition to the first parameter pairs are edges, the integrated graph containing the nodes and edges of the first parameter pairs of the first database integrated with the nodes and edges of the second parameter pairs of the second database, wherein the graph searcher is further configured to search the integrated graph based on one or more search conditions and to output the corresponding search results, wherein the graph searcher is further configured to search the integrated graph based on one or more search conditions and to output the corresponding search results, wherein the one or more search conditions include finding new connection path between the nodes of the integrated graph, and the one or more search results include new relationships between the material property parameters, wherein each integrated graph generated by the graph generator is configured to be made as a search target for the graph searcher only by the user whose second parameter pairs were used to generate the integrated graph or by other users authorized by the user, the search system thereby allowing for user-specific knowledge utilization and user-specific search.

2. The search system according to claim 1, wherein:

the database input unit further includes a material property parameter relationship information extractor, a material property parameter matching unit, and a thesaurus;

the material property parameter relationship information extractor is configured to extract a plurality of second material property parameter names from the second database;

the material property parameter matching unit is configured to refer to the thesaurus, collate the plurality of second material property parameter names individually for each user with plurality of first material property parameter names stored in the first database, and, if they are different, change the second material property parameter name to the first material property parameter name so that the material property parameter names are matched with each other.

3. The search system according to claim 2, wherein:

the user interface further comprises a relationship information collator; and the relationship information collator is configured to collate relationship information about a pair of the same material property parameters between the first parameter pair and the second parameter pair and assign conditional edges between nodes of the same material parameter pairs with different conditions when relationships of the first and second parameter pairs are different form each other due to different conditions.

4. The search system according to claim 1, wherein:

the user interface further includes a search interface and a search history manager;

the search interface is configured to input a search condition specified by the user to the graph searcher and output a search result output from the graph searcher to the user;

the search history manager is configured to hold at least a search condition among search conditions and corresponding search results separately for each user in the user information storage unit as a search history; and the user interface is configured so that the user can refer to the search history held in the user information storage unit.

5. The search system according to claim 4, wherein:

the user interface further includes a search history analyzer; and the search history analyzer is configured to analyze the search history held in the user information storage unit separately for each user and present an analysis result to the user.

6. A search system implemented in a computer comprising: a memory and a processor configured to execute a sequence of programmed instructions stored in the memory to perform a search by the search system, the search system comprising a database stored in the memory, a graph generator, a graph searcher, a material property parameter relationship information extractor, and a verifier, wherein:

the database stores a plurality of parameter pairs of material property parameters having mutual relationships;

the graph generator generates a graph in which a plurality of material property parameters included in the parameter pairs are nodes and in between the nodes corresponding to the parameter pairs is an edge;

the graph searcher searches the graph based on a provided search condition and outputs a search result;

the material property parameter relationship information extractor extracts information on a material property parameter pair and a relationship therebetween by machine learning targeting natural language, and includes a learning model generator and a relationship extractor;

the learning model generator generates a material property name model and a relationship expression model as learning models from supplied learning data and supplies the generated learning models to the relationship extractor;

the learning data includes document data that defines material property names and their relationships;

the relationship extractor, to which document data is input, extracts, by using a material property name list created from the material property name model and a relationship expression list created from the relationship expression model, a triple including two material property names corresponding to a pair of material property parameters having a causal relationship and a relationship expression representing the relationship based on a positional relationship among the material property names and the relationship expression in the input document data, and outputs the triple as output data; and the search system updates contents of the database with the output data, wherein:

the material property parameter relationship information extractor further includes a cleaner to which a corpus is input, the corpus being a database in which ancillary attributes including part of speech and syntax are structured in material property parameters based on a technical terminology dictionary; and the cleaner removes, based on the corpus, triples that are determined not to indicate a relationship between material property parameters pairs from the triples extracted by the relationship extractor to obtain the output data; and wherein the verifier collates the relationship of the material property parameter pairs already included in the database with the relationship of the material property parameter pairs extracted by the material property parameter relationship information extractor to confirm there are no inconsistencies therebetween, the search system thereby securing reliability of the contents of the database.

7. A search method implemented in a computer processing system as a sequence of programmed instructions stored in a memory to be executed by the computer processing system, the search method comprising:

generating a graph from a first database stored in the memory; and searching the graph, wherein:

the first database stores a plurality of first parameter pairs of material property parameters having mutual relationships, the material property parameters indicating properties of materials;

the graph is a graph in which material property parameters included in each of the first parameter pairs are nodes and in between the nodes corresponding to each first parameter pair is an edge; and the graph is searched under a provided search condition;

the search method further comprises:

extracting, from a second database containing user specific material property parameter relationship information, second parameter pairs, the second parameter pairs being user-specific;

storing separately for each user, in a user information storage unit, the second parameter pairs, each user having been granted access by the computer processing system based on user identification information;

the second parameter pairs being pairs of material property parameters having mutual relationships; and generating an integrated graph containing the nodes and edges of the first parameter pairs of the first database integrated with nodes and edges of the second parameter pairs of the second database, searching the integrated graph based on a search condition and outputting a corresponding search result, wherein the search condition includes finding new connection paths between the nodes of the integrated graph, wherein the search result includes presence or absence of a new relationship between the material property parameters, and wherein the search result includes presence or absence of a new relationship between the material property parameters, and wherein an integrated graph can be searched only by the user whose second parameter pairs were used to generate the integrated graph or by other users authorized by the user, the search method thereby ensuring user-specific knowledge utilization and user-specific searching.

8. The search method according to claim 7, wherein:

the graph is a graph in which a plurality of material property parameters included in either of the first or the second parameter pairs are nodes, and in between the nodes corresponding to the second parameter pairs in addition to the first parameter pairs are edges.

9. The search method according to claim 8, further comprising extracting from the second database a material property parameter relationship information and matching a material property parameter, wherein:

in the extracting, a plurality of second material property parameter names are extracted from the second database; and in the matching, a thesaurus is referred to, the plurality of second material property parameter names are collated with plurality of first material property parameter names stored in the first database, and if they are different, the second material property parameter name is changed to the first material property parameter name for the matching of the names of the material property parameters.

10. The search method according to claim 8, further comprising collating relationship information, wherein:

relationship information for pairs of the same material property parameters is collated between the first parameter pairs and the second parameter pairs; and conditional edges are assigned between nodes of the same material parameter pairs with different conditions when relationships of the first and second parameter pairs are different from each other due to different conditions.

11. A search method implemented in a computer processing system as a sequence of programmed instruction stored in a memory to be executed by the computer processing system, the search method comprising:

generating a graph from a database; and searching the graph, wherein:

the database stores a plurality of parameter pairs of material property parameters having mutual relationships;

the graph is a graph in which a plurality of material property parameters included in parameter pairs are nodes and in between the nodes corresponding to the parameter pairs are edges; and the graph is searched under a provided search condition;

the search method further comprising extracting information on a material property parameter pair and a relationship therebetween by machine learning that targets natural language, the extracting including:

generating a learning model; and extracting a relationship, wherein:

in the generating of the learning model, a material property name model and a relationship expression model are generated as learning models from supplied learning data and the generated learning models are supplied to the relationship extraction;

the learning data includes document data that defines material property names and their relationships, and the document data is input to the relationship extraction; and in the extracting of the relationship, by using material property name list created from the material property name model and relationship expression list created from the relationship expression model, a triple including two material property names corresponding to a pair of material property parameters having a causal relationship and a relationship expression representing the relationship is extracted based on a positional relationship among the material property names and the relationship expression in the input document data, and the triple is output as output data;

the search method further comprising:

updating contents of the database with the output data; and performing a cleaning process in which a corpus is input, the corpus being a database in which ancillary attributes including part of speech and syntax are structured in material property parameters based on a technical terminology dictionary, wherein in the cleaning process, triples that are determined not to indicate a relationship between material property parameter pairs are removed based on the corpus from the triples extracted in the relationship extraction to obtain the output data, the search method further comprising:

collating the relationship of the material property parameter pairs already included in the database with the relationship of the material property parameter pairs extracted by the material property parameter relationship information extractor to confirm there are no inconsistencies therebetween, the search method thereby securing reliability of the contents of the database.

* * * * *